United States Patent
Chester et al.

(10) Patent No.: US 11,119,328 B2
(45) Date of Patent: Sep. 14, 2021

(54) LIGHT PROJECTION ENGINE ATTACHMENT AND ALIGNMENT

(71) Applicant: Flex Ltd., Singapore (SG)

(72) Inventors: Peter Chester, Sunnyvale, CA (US); Robert J. Groppo, Sunnyvale, CA (US); Zhang Yunqi, Suzhou (CN); Ori Jacobi, Tel Aviv (IL)

(73) Assignee: Flex Ltd., Singapore (SG)

( * ) Notice: Subject to any disclaimer, the term of this patent is extended or adjusted under 35 U.S.C. 154(b) by 382 days.

(21) Appl. No.: 16/110,993

(22) Filed: Aug. 23, 2018

(65) Prior Publication Data

US 2019/0064529 A1    Feb. 28, 2019

Related U.S. Application Data

(60) Provisional application No. 62/549,079, filed on Aug. 23, 2017.

(51) Int. Cl.
*G02B 27/01* (2006.01)

(52) U.S. Cl.
CPC ..... *G02B 27/0176* (2013.01); *G02B 27/0172* (2013.01); *G02B 2027/0159* (2013.01)

(58) Field of Classification Search
CPC ............ G02B 27/0176; G02B 27/0172; G02B 27/017; G02B 27/0154; G02B 2027/0178; G02B 2027/0176; G02B 2027/0172; G02B 2027/0159; G06T 19/00; G02C 3/00

See application file for complete search history.

(56) References Cited

U.S. PATENT DOCUMENTS

| | | | | |
|---|---|---|---|---|
| 5,598,231 A | * | 1/1997 | Lin | G02B 27/0176 351/49 |
| 5,696,521 A | * | 12/1997 | Robinson | G02B 27/017 345/8 |
| 5,886,735 A | * | 3/1999 | Bullister | H04N 7/142 348/14.16 |
| 6,157,291 A | * | 12/2000 | Kuenster | G02B 27/0172 345/8 |
| 6,587,167 B1 | * | 7/2003 | Fujimori | H04N 9/3141 349/58 |
| 7,118,222 B2 | * | 10/2006 | Kitabayashi | G03B 21/16 353/52 |
| 9,933,624 B1 | * | 4/2018 | White | A63G 31/02 |
| 10,514,494 B2 | * | 12/2019 | Groppo | G02B 6/0088 |
| 10,627,633 B2 | * | 4/2020 | Liao | G02C 7/10 |

(Continued)

OTHER PUBLICATIONS

"Cartesian coordinate system," WikipediA, retrieved from https://en.wikipedia.orghviki/Cartesian_coordinate_system, retrieved on Mar. 12, 2019, 13 pages.

(Continued)

*Primary Examiner* — Daniel I Walsh
(74) *Attorney, Agent, or Firm* — Sheridan Ross P.C.

(57) ABSTRACT

Methods and systems are for aligning a light projection engine (e.g., in a virtual reality headset) are described. An assembly for aligning the light projection engine includes a frame, an optical waveguide assembly; and the light projection engine. Embodiments include assemblies for aligning based on a pivot point, an optical axis, an X, a Y, and a Z axis, and with six degrees of freedom. In addition, an embodiment includes three planar joints that allow for alignment of the light projection engine.

10 Claims, 20 Drawing Sheets

(56) References Cited

U.S. PATENT DOCUMENTS

| | | | |
|---|---|---|---|
| 10,671,118 B1* | 6/2020 | Zhang | G06F 1/1639 |
| 10,690,936 B2* | 6/2020 | Heisey | G02B 27/0176 |
| 10,725,305 B2* | 7/2020 | Tempel | G02B 27/0176 |
| 10,728,649 B1* | 7/2020 | Holman | H04R 1/1041 |
| 10,782,537 B1* | 9/2020 | Chao | G01S 7/4815 |
| 10,890,767 B1* | 1/2021 | Fernandez | A61B 3/103 |
| 10,928,637 B2* | 2/2021 | Holzinger | G02B 27/0149 |
| 10,986,303 B2* | 4/2021 | Totani | G02B 27/0176 |
| 2002/0105738 A1* | 8/2002 | Kobayashi | G02B 27/0176 359/834 |
| 2003/0000001 A1 | 1/2003 | McDonald | A62B 7/14 2/6.3 |
| 2003/0184868 A1* | 10/2003 | Geist | G02B 27/0172 359/630 |
| 2005/0105054 A1* | 5/2005 | Arai | H04N 9/3144 353/20 |
| 2005/0105063 A1* | 5/2005 | Kitabayashi | G03B 21/145 353/119 |
| 2005/0174470 A1* | 8/2005 | Yamasaki | G03B 17/04 348/345 |
| 2005/0230596 A1* | 10/2005 | Howell | G02C 5/001 250/200 |
| 2007/0013865 A1* | 1/2007 | Jordan | G02C 11/04 351/158 |
| 2007/0121062 A1* | 5/2007 | Habermann | G02C 5/2209 351/153 |
| 2008/0239523 A1* | 10/2008 | Beck | G02B 27/0176 359/823 |
| 2009/0019620 A1* | 1/2009 | Reed | A61F 9/025 2/438 |
| 2010/0157433 A1* | 6/2010 | Mukawa | G02B 27/0172 359/633 |
| 2011/0051076 A1* | 3/2011 | Sugihara | G02C 9/00 351/158 |
| 2011/0221656 A1* | 9/2011 | Haddick | G06F 3/017 345/8 |
| 2012/0200934 A1* | 8/2012 | Fujishiro | G02B 27/0179 359/630 |
| 2012/0200935 A1* | 8/2012 | Miyao | G02B 27/0172 359/630 |
| 2012/0212484 A1* | 8/2012 | Haddick | G02B 27/017 345/419 |
| 2012/0212499 A1* | 8/2012 | Haddick | G06F 3/017 345/589 |
| 2013/0250503 A1* | 9/2013 | Olsson | G02C 5/02 361/679.03 |
| 2013/0278631 A1* | 10/2013 | Border | G02C 5/143 345/633 |
| 2013/0293448 A1* | 11/2013 | Jannard | G02C 11/06 345/8 |
| 2014/0085190 A1* | 3/2014 | Erinjippurath | G02B 27/0172 345/156 |
| 2014/0139403 A1* | 5/2014 | Hiraide | G02B 27/0176 345/8 |
| 2014/0139927 A1* | 5/2014 | Hiraide | G02B 27/0176 359/630 |
| 2014/0168784 A1* | 6/2014 | Hiraki | G02B 27/0176 359/630 |
| 2014/0232619 A1* | 8/2014 | Hiraide | G02B 1/045 345/8 |
| 2015/0036221 A1* | 2/2015 | Stephenson | G02B 27/0101 359/630 |
| 2015/0168730 A1* | 6/2015 | Ashkenazi | G02B 27/0172 359/631 |
| 2015/0177520 A1* | 6/2015 | Hiraide | G02B 27/0006 359/514 |
| 2015/0185477 A1* | 7/2015 | Hiraide | G02B 27/017 345/8 |
| 2015/0219899 A1* | 8/2015 | Mack | G06F 3/011 345/633 |
| 2015/0261015 A1* | 9/2015 | Han | G02B 27/0176 351/158 |
| 2015/0375007 A1* | 12/2015 | Takeuchi | A61N 5/0617 607/90 |
| 2016/0011424 A1* | 1/2016 | Thurber | G02B 27/0172 345/8 |
| 2016/0033772 A1* | 2/2016 | Han | H04N 1/6083 359/630 |
| 2016/0054571 A1* | 2/2016 | Tazbaz | G02B 27/0176 359/630 |
| 2016/0246059 A1* | 8/2016 | Halpin | G02B 27/0176 |
| 2016/0349509 A1* | 12/2016 | Lanier | G06F 3/011 |
| 2017/0010467 A1* | 1/2017 | Ellsworth | G02B 27/0172 |
| 2017/0131547 A1* | 5/2017 | Andreev | G02B 27/0149 |
| 2017/0184862 A1* | 6/2017 | Miyao | G02B 6/0001 |
| 2017/0235147 A1* | 8/2017 | Kamakura | G02C 5/16 359/630 |
| 2017/0235148 A1* | 8/2017 | Kamakura | G02C 5/126 359/630 |
| 2017/0237935 A1* | 8/2017 | Totani | G02B 27/0176 348/802 |
| 2017/0261753 A1* | 9/2017 | Fujishiro | G06F 1/163 |
| 2017/0343802 A1* | 11/2017 | Ling | G02B 26/0825 |
| 2018/0017208 A1* | 1/2018 | Shanley, IV | H04N 5/247 |
| 2018/0017786 A1* | 1/2018 | Kamakura | G02B 27/0172 |
| 2018/0024368 A1* | 1/2018 | Takagi | G02B 27/0176 359/633 |
| 2018/0024369 A1* | 1/2018 | Kato | G02B 27/0176 359/13 |
| 2018/0052327 A1* | 2/2018 | Kamakura | G02B 27/0103 |
| 2018/0088335 A1* | 3/2018 | Ide | G02B 27/0025 |
| 2018/0188542 A1* | 7/2018 | Waldern | G02B 27/0172 |
| 2018/0196268 A1* | 7/2018 | Westra | G02B 7/004 |
| 2018/0227975 A1* | 8/2018 | Kihlberg | H04R 5/033 |
| 2018/0239150 A1* | 8/2018 | Yoshida | G02B 27/0176 |
| 2018/0250183 A1* | 9/2018 | Zwierstra | A61B 5/1127 |
| 2019/0041666 A1* | 2/2019 | Abele | G02B 27/00 |
| 2019/0064529 A1* | 2/2019 | Chester | G02B 27/0172 |
| 2019/0111336 A1* | 4/2019 | Gutierrez | A63F 13/65 |
| 2019/0171023 A1* | 6/2019 | Carlvik | G02B 27/0172 |
| 2019/0212563 A1* | 7/2019 | Schultz | G02B 5/04 |
| 2019/0235623 A1* | 8/2019 | Pollard | G02B 7/023 |
| 2019/0293939 A1* | 9/2019 | Sluka | G02B 27/0075 |
| 2019/0369402 A1* | 12/2019 | Woodman | G02B 27/017 |
| 2020/0049923 A1* | 2/2020 | Goodale | G01B 11/254 |
| 2020/0060571 A1* | 2/2020 | Dauguet | A61B 5/6843 |
| 2020/0073125 A1* | 3/2020 | Kimura | H05K 7/20954 |
| 2020/0233213 A1* | 7/2020 | Porter | G02B 27/0101 |
| 2020/0259989 A1* | 8/2020 | Li | H04N 5/2353 |
| 2020/0319468 A1* | 10/2020 | Kobayashi | G02B 27/0176 |
| 2020/0357183 A1* | 11/2020 | Weber | G06T 19/006 |
| 2020/0387341 A1* | 12/2020 | Robinson | G10L 25/51 |
| 2021/0063755 A1* | 3/2021 | Kamakura | G02B 27/0176 |

OTHER PUBLICATIONS

Jaishanker, "Virtual reality 101—The different types of VR headsets," Yourstory, 2016, retrieved from https://yourstory.com/2016/06/virtual-reality-headset/, retrieved on Mar. 12, 2019, 10 pages.

* cited by examiner

LIGHT PROJECTION ENGINE ATTACHMENT AND ALIGNMENT

CROSS REFERENCE TO RELATED APPLICATIONS

The present application claims the benefits of and priority, under 35 U.S.C. § 119(e), to U.S. Provisional Application Ser. No. 62/549,079 filed on Aug. 23, 2017, entitled "Projection Engine Attachment and Alignment." The entire disclosures of the application listed above is hereby incorporated by reference, in its entirety, for all that it teaches and for all purposes.

FIELD

The present disclosure is related light projection systems, in particular, toward light projection system assemblies.

BACKGROUND

A virtual reality headset relies on optical energy projected from a light projection engine (e.g., a Digital Light Processor (DLP)) into an optical waveguide. The optical waveguide then reflects the light (e.g., an image) to the user. The optical waveguide is typically made of glass that includes a series of precision ridges that reflect light at different angles to present a larger image on the optical waveguide to the user.

To ensure proper performance of an optical waveguide it is critical that the light projection engine's light output is precisely aligned to the input interface of the optical waveguide. If the light projection engine is not precisely aligned, the optical performance of the optical waveguide is decreased and/or distorted. Depending on the required optical performance, alignment requirements, and tolerance of the components in the system, it is often difficult to achieve alignment of the light projection engine.

It is equally important to maintain accurate left/right image alignment to present to the user an accurately aligned stereoscopic image to accommodate the human visual perception system.

DETAILED DESCRIPTION

Figure 1:
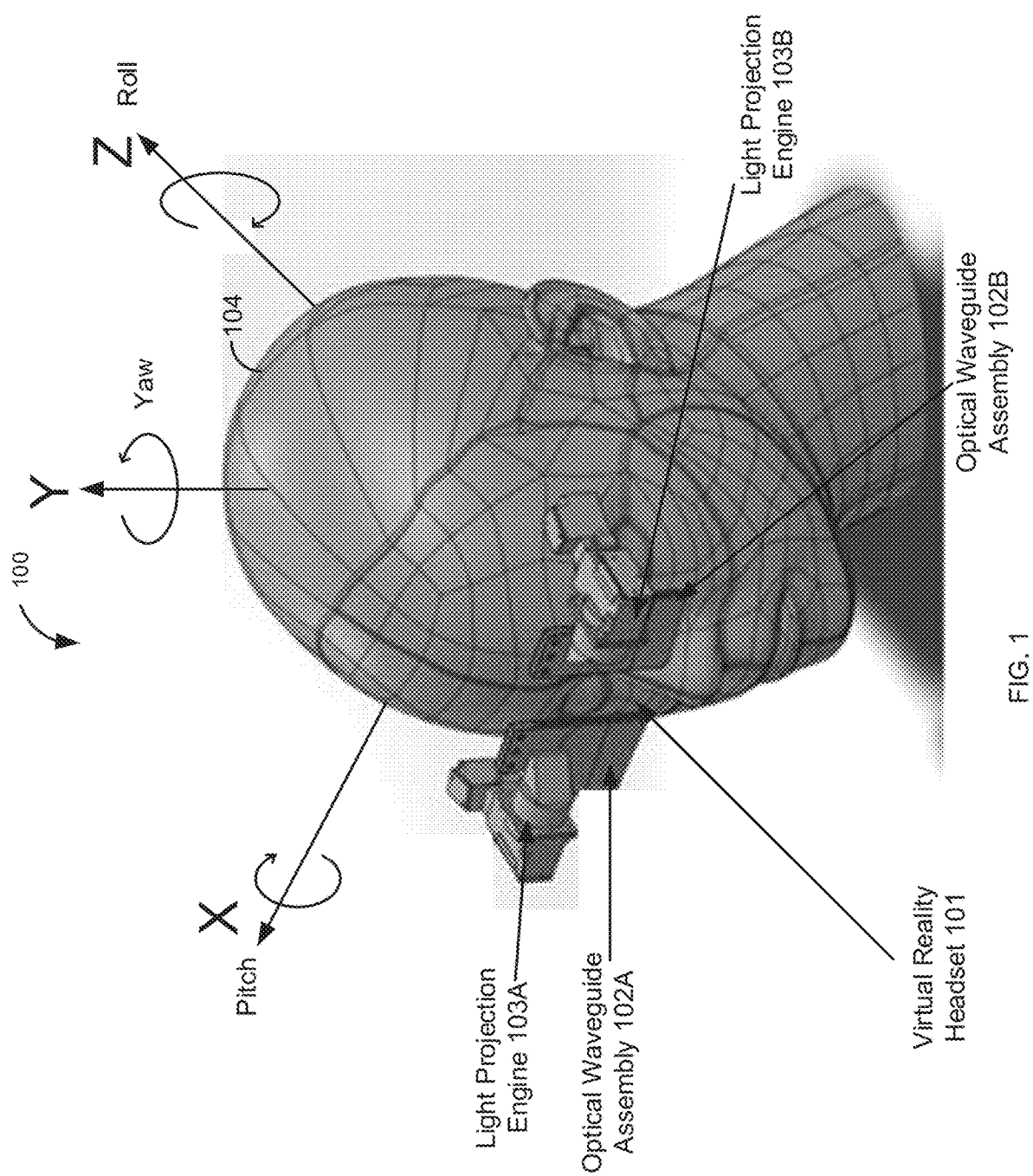
FIG. 1 is an exemplary view of a virtual reality headset on a user in accordance with embodiments of the present disclosure.

FIG. 1 is an exemplary view 100 of a virtual reality headset 101 on a user 104 in accordance with embodiments of the present disclosure. The exemplary view 100 comprises the virtual reality headset 101 and a user 104.

The virtual reality headset 101 can be or may include any headset that projects a stereoscopic or monocular image for display to the user 104. The stereoscopic virtual reality headset 101 further comprises optical waveguide assemblies 102A-102B and light projection engines 103A-103B. The optical waveguide assemblies 102A-102B can be or may include any type of known optical waveguide assemblies that receives a projected image from a light projection engine 103 for displaying the projected image to the user 104. For example, the optical waveguide assemblies 102A-102B may comprise a front lens, one or more optical waveguides, and a back lens that are adhered together to from the optical waveguide assemblies 102A-102B. The optical waveguide assemblies 102A-102B, as described herein and in the claims, may comprise only a single optical waveguide and/or any combination of the above.

An "optical waveguide" is typically a spatially inhomogeneous structure for guiding light, i.e. for restricting the spatial region in which light can propagate. Usually, an optical waveguide contains a region of increased refractive index, compared with the surrounding medium (called cladding). However, guidance is also possible, e.g., by the use of reflections, e.g. at metallic interfaces. Some waveguides also involve plasmonic effects at metals. Many waveguides exhibit two-dimensional guidance, thus restricting the extension of guided light in two dimensions and permitting propagation essentially only in one dimension. An example is a channel waveguide. The most important type of two-dimensional waveguide is an optical fiber. Waveguides can also be one-dimensional waveguides, specifically planar waveguides.

The light projection engines 103A-103B can be or may include any device that can project an image, such as, a Digital Light Processor (DLP), a projector, a Liquid crystal on Silicon (LCOS), a Light Emitting Diode (LED) array, a laser, and/or the like. The light projection engines 103A-103B projects light to the optical waveguide assemblies 102A-102B. The light projection engines 103A-103B are typically an assembly of multiple components, such as a DLP, one or more lenses, a prism, a housing, and/or the like. The light projection engines 103A-103B are connected to a frame.

Although the virtual reality headset has two light projection engines 103A-103B and two optical waveguide assemblies 102A-102B, it would be clear to one of skill in the art that a virtual reality headset 101 may only have a single light projection engine 103 and a single optical waveguide assembly 102.

One key aspect of a virtual reality headset 101 is that the light projection engines 103A-103B need to be precisely aligned with the optical waveguide assemblies 102A-102B. If either of the light projection engines 103A-103B are misaligned with its corresponding optical waveguide assembly 102A-102B, a distorted image may be projected to the user 104. Depending on the type of misalignment, the result may cause eye strain and/or headaches for the user 104. The alignment of the optical waveguide assemblies 102A-102B with the light projection engines 103A-103B is typically based on three types of alignment: 1) pitch (the X axis, 2) yaw (the Y axis), and 3) roll (the Z axis). This is the same as the well-known Cartesian coordinate system (e.g., as discussed in https://en.wikipedia.org/wiki/Cartesian_coordinate_system).

The pitch is the rotation of the light projection engine 103 in relation to the optical waveguide assembly 102 on the X axis. The yaw is the rotation of the light projection engine 103 in relation to the waveguide assembly 102 on the Y axis. The roll is the rotation of the light projection engine 103 in relation to the optical waveguide assembly 102 on the Z axis.

Figure 2:
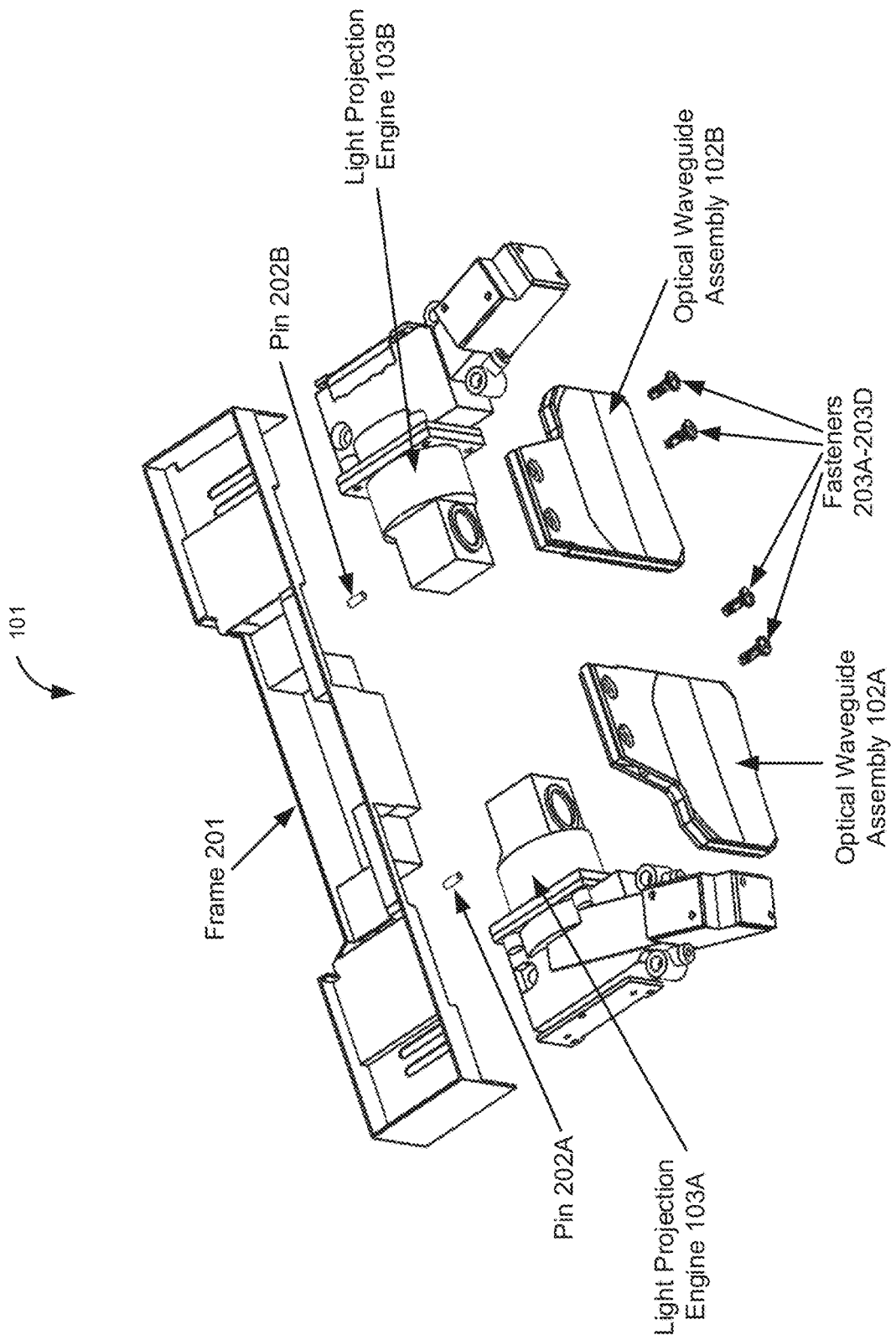
FIG. 2 is an exemplary embodiment of a virtual reality headset that has a single method for active alignment of light projection engines in accordance with embodiments of the present disclosure.

FIG. 2 is an exemplary embodiment of a virtual reality headset 101 that has a single method for active alignment of light projection engines 103A-103B in accordance with embodiments of the present disclosure. The virtual reality headset 101 comprises a frame 201, pins 202A-202B, fasteners (e.g., screws or other types of fasteners) 203A-203D, the optical waveguide assemblies 102A-102B, and the light projection engines 103A-103B.

The optical waveguide assemblies 102A-102B connect to the frame 201 via the fasteners (e.g., screws or other type of fasteners) 203A-203D. The light projection engines 103A-103B connect to the frame 201 via the pins 202A-202B. The use of pins 202A-202N allow the light projection engines 103A-103B to rotate on the Z axis (roll) in relation to the optical waveguide assemblies 102A-102B that are attached to the frame 201.

Figure 3:
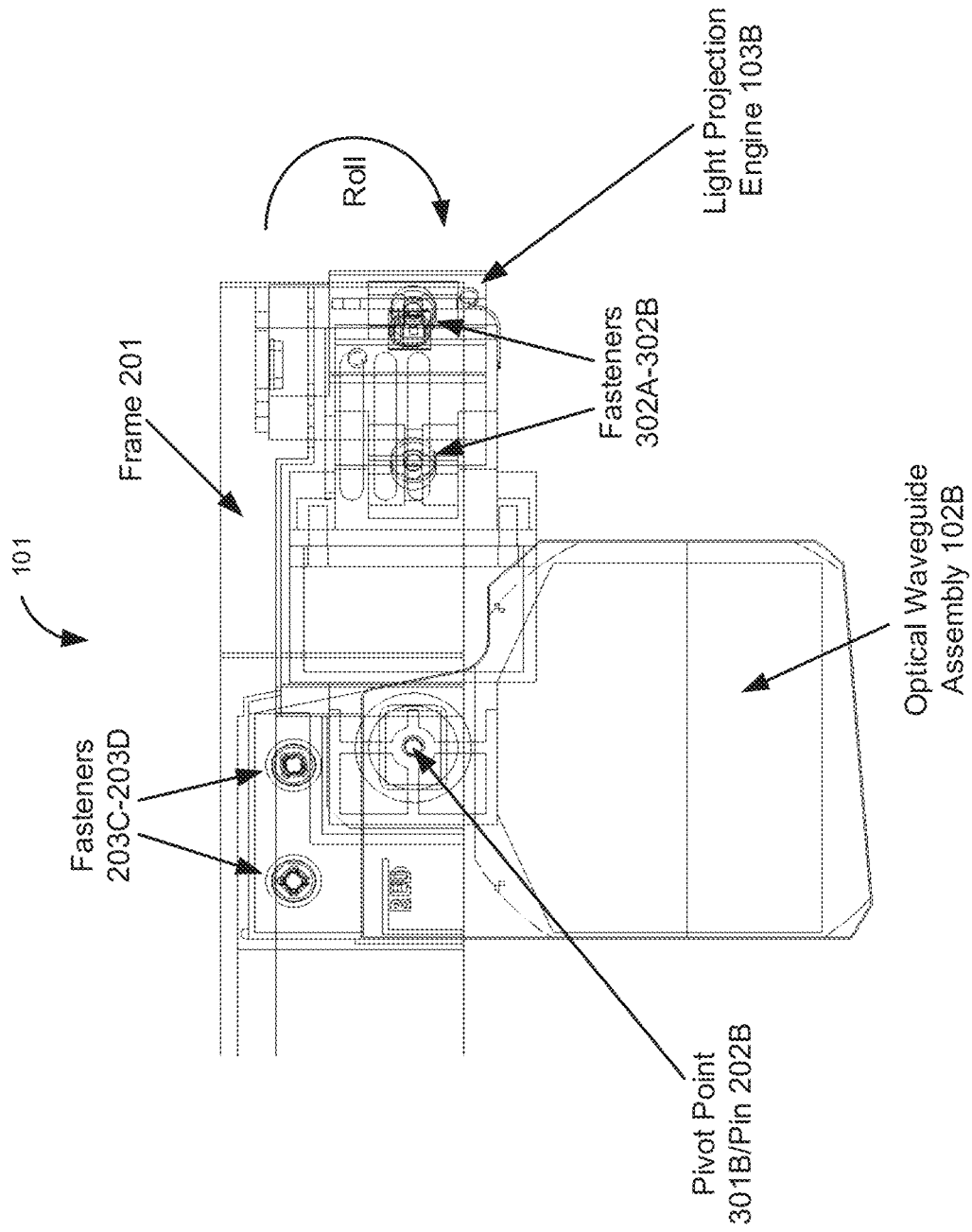
FIG. 3 is a front view of a portion of a virtual reality headset that has a single method for active alignment of a light projection engine in accordance with embodiments of the present disclosure.

FIG. 3 is a front view of a portion of a virtual reality headset 101 that has a single method for active alignment of a light projection engine 103 in accordance with embodiments of the present disclosure. FIG. 3 is a front view of the right side of the virtual reality head 101 set. The pin 202B allows the light projection engine 103B to rotate in relation to the optical waveguide assembly 102B on the Z axis (the roll) using the pivot point 301B. The pivot point 301B allows the light projection engine 103B to properly align on the Z axis (the roll) to the optical waveguide assembly 102B. The fasteners (e.g., screws or other types of fasteners) 302A-302B connect to the frame 201. Although two fasteners 302A-302B are shown in FIG. 3, there may only be a single fastener 302 or there may be more than two fasteners 302. The holes in the frame 201 are slightly larger (or slotted) than the fasteners 302A-302B. This allows a freedom of movement of the light projection engine 103 on the pivot point 301B. Once the light projection engine 103B is properly aligned with the optical waveguide assembly 102B, the fasteners 302A-302B can be tightened to lock in the alignment of the light projection engine 103B on the Z axis.

For example, in a manufacturing environment, the virtual reality headset 101 may be placed in a fixture where a person or machine adjusts the roll of the light projection engine 103B until a proper alignment is determined. The user/machine then inserts and tightens the fasteners 302A-302B to lock the alignment. For example, the fasteners 302A-302B may be inserted and tightened from the front or back of the virtual reality headset 101.

Figure 4:
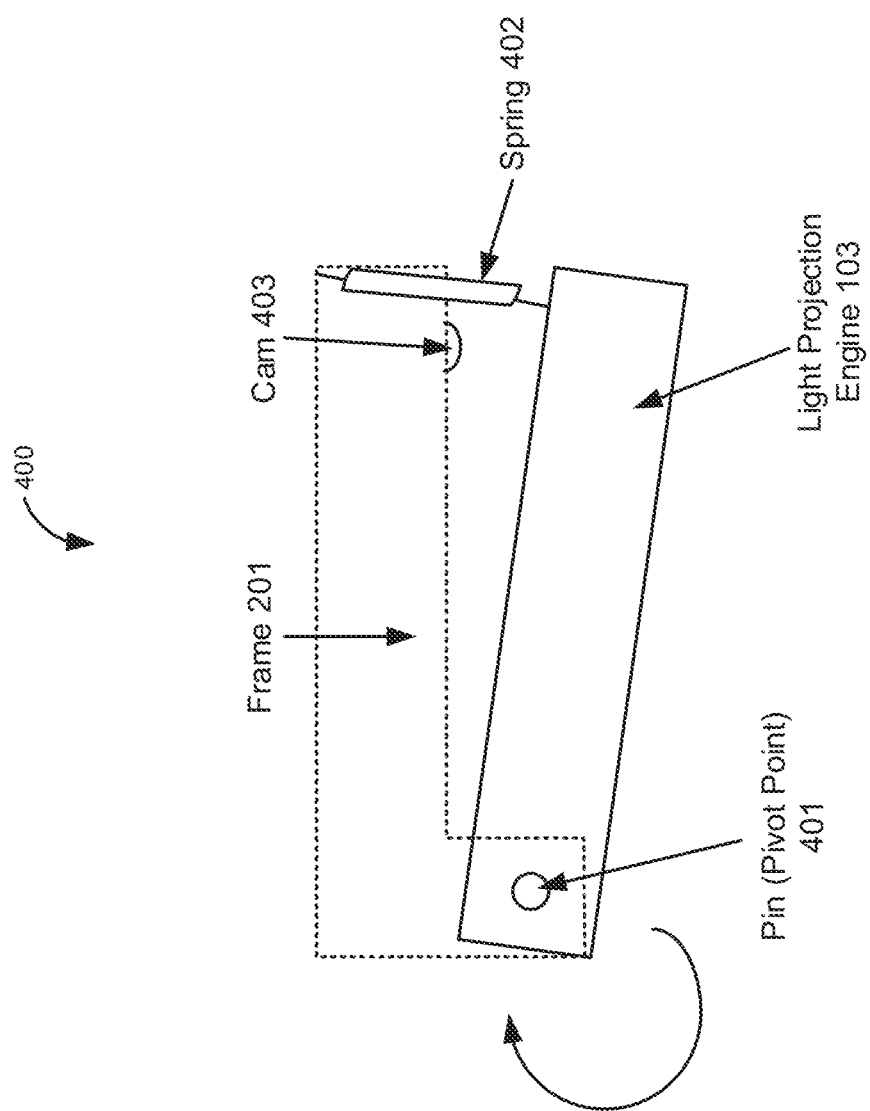
FIG. 4 is an exemplary embodiment of a virtual reality headset that has a single method for active alignment of a light projection engine in accordance with embodiments of the present disclosure.

FIG. 4 is an exemplary embodiment 400 of a virtual reality headset 101 that has a single method for active alignment of a light projection engine 103 in accordance with embodiments of the present disclosure. The light projection engine 103 rotates using the pivot point 401 (e.g., a pin). The pivot point 401 is attached to the frame 201 and allows the light projection engine 103 to rotate according to the Y axis (yaw) in relation to the optical waveguide assembly 102 (not shown), which is attached to the frame 201. The cam 403 stops rotation of the light projection engine 103. In one embodiment, the cam 403 may be the end of a fastener that can move inward or outward in relation to the frame 201. The spring 402 provides tension to limit the movement of the light projection engine 103. Once the light projection engine 103 is properly aligned along the Y axis (yaw), fasteners and/or liquid adhesive can be applied to lock the light projection engine 103 in proper alignment on the Y axis (yaw) in relation to the waveguide assembly 102.

For example, in a manufacturing environment, the virtual reality headset 101 may be placed in a fixture where a person or machine adjusts the yaw of the light projection engine 103 until a proper alignment is determined. The user/machine then inserts and tightens the fasteners, which lock the light projection engine 103 in proper alignment.

Figure 5:
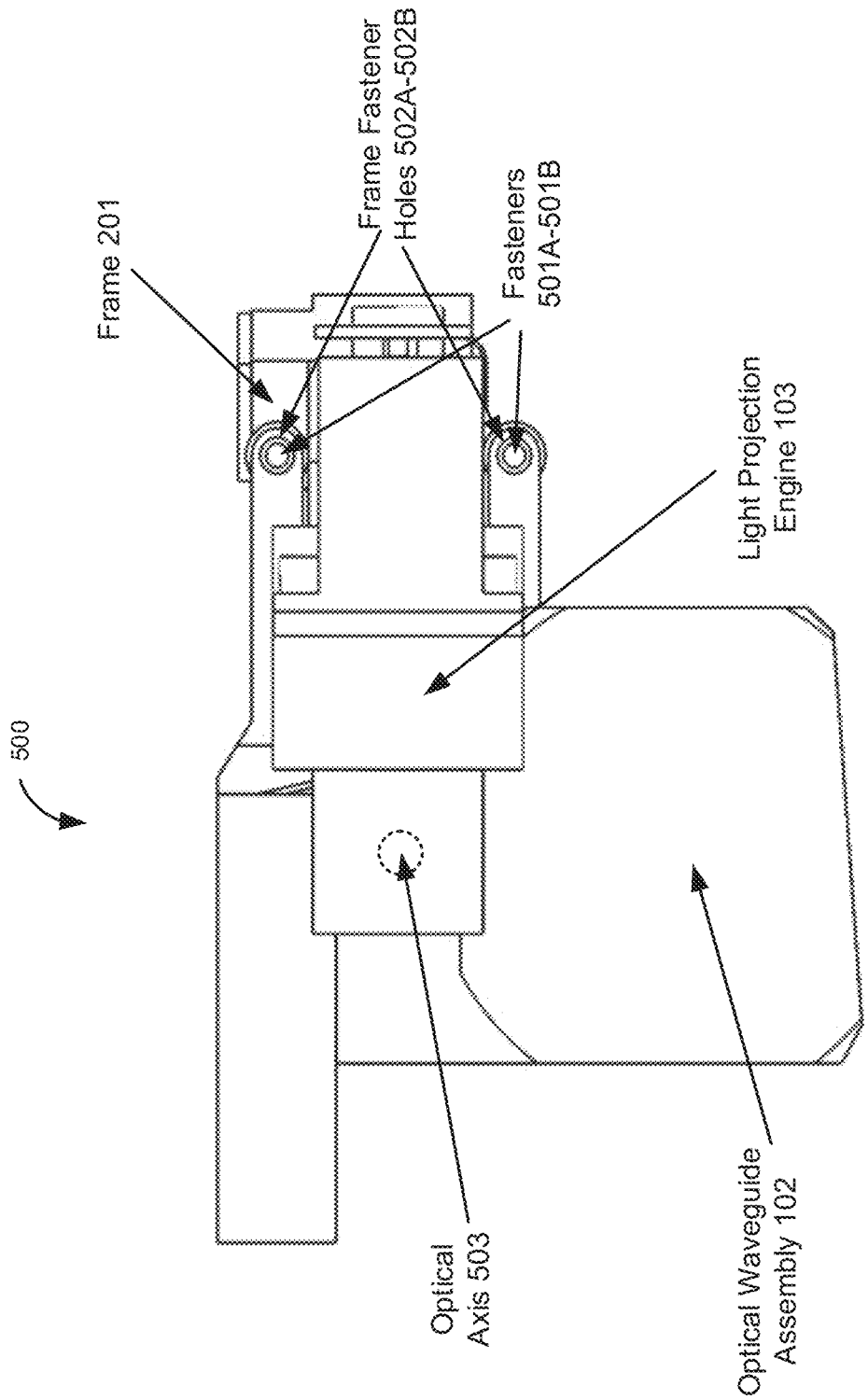
FIG. 5 is a front view of an exemplary embodiment of for aligning a light projection engine using an optical axis in accordance with embodiments of the present disclosure.

FIG. 5 is a front view of an exemplary embodiment 500 of for aligning of a light projection engine 103 using an optical axis in accordance with embodiments of the present disclosure. FIG. 5 shows the optical waveguide assembly 102, the light projection engine 103, the frame 201, fasteners 501A-501B, frame fastener holes 502A-502B, and optical axis 503.

The frame fastener holes 502A-502B are larger than the fasteners (e.g., screws or other types of fasteners) 501A-501B. The gap between the frame fastener holes 502A-502B and the fasteners 501A-501B allows for a small amount of adjustment (a freedom of movement) that is centered on the optical axis 503. This allows the light projection engine 103 to align with the optical waveguide assembly 102 on the Z axis (roll). Although FIG. 5 is described with two fasteners 501A-501B, a single fastener 501 or more than two fasteners 501 may be used.

Figure 6B:
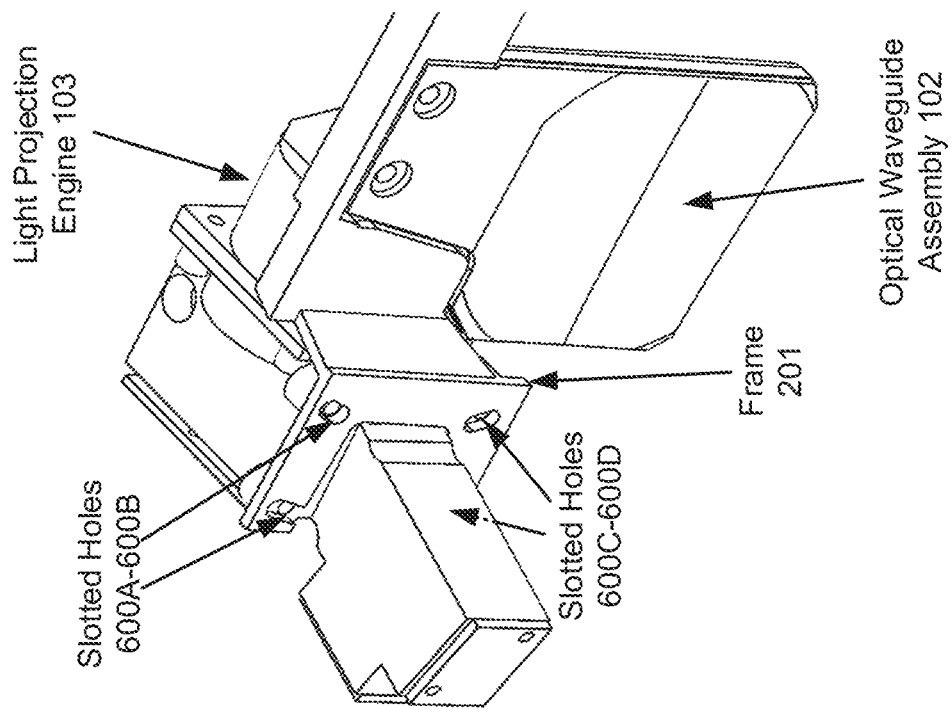
FIG. 6B is an angled back view of an exemplary embodiment of for aligning of a light projection engine using slotted holes on an optical axis in accordance with embodiments of the present disclosure.
Figure 6A:
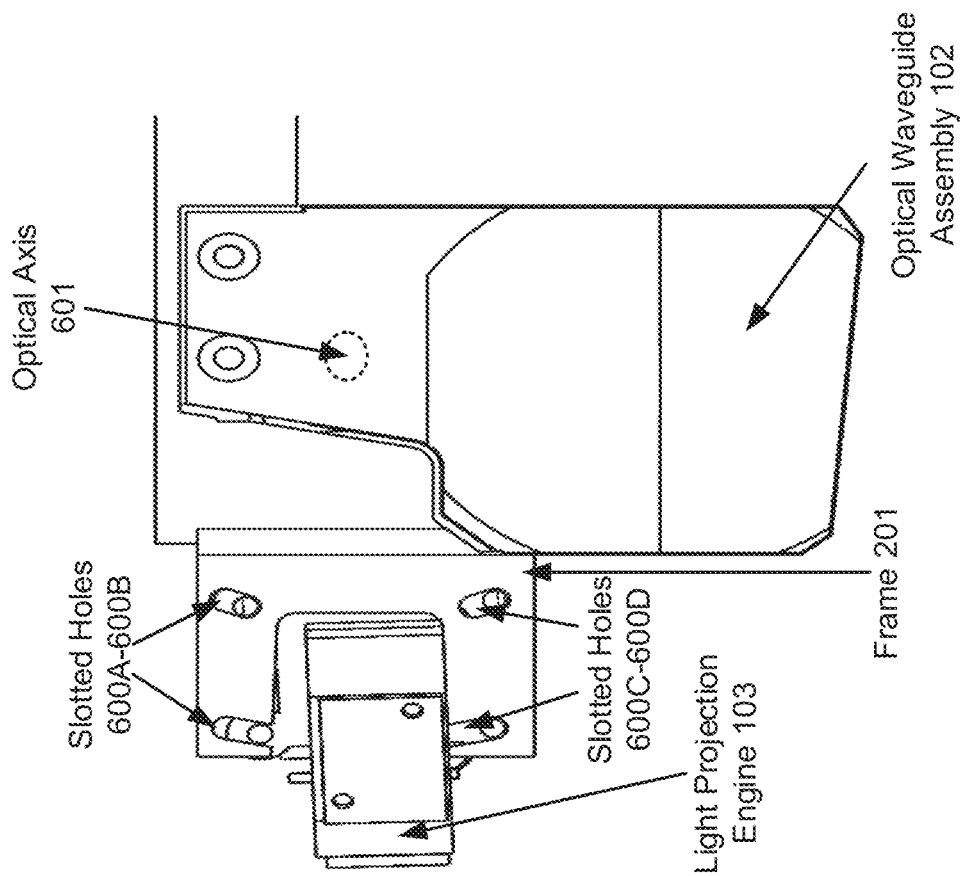
FIG. 6A is a back view of an exemplary embodiment of for aligning a light projection engine using slotted holes on an optical axis in accordance with embodiments of the present disclosure.

FIG. 6A is a back view of an exemplary embodiment of for aligning of a light projection engine 103 using slotted holes 600A-600B on an optical axis 601 in accordance with embodiments of the present disclosure. In FIG. 6A, the optical waveguide assembly 102 is attached to the frame 201. The frame 201 has four slotted holes 600A-600D. The slotted holes 600A-600D are angled in relation to the optical axis 601. In one embodiment, the slotted holes 600A-600D are curved in relation to the optical axis 601.

The light projection engine 103 has four corresponding pins (shown as small circles in the slotted holes 600A-600D). The four corresponding pins on the light projection engine 103 align with the slotted holes 600A-600D and extend through the slotted holes 600A-600D. The slotted holes allow the light projection engine 103 to be aligned based on the optical axis 601. Once the light projection engine 103 is determined to be properly aligned, liquid adhesive can be applied to the slotted holes 600A-600D. Alternatively, screws, bolts, or other types of fasteners (not shown) may be used in place of pins/liquid adhesive.

FIG. 6B is an angled back view of an exemplary embodiment of for aligning of a light projection engine 103 using slotted holes 600A-600D on an optical axis 601 in accordance with embodiments of the present disclosure. FIG. 6B shows a different view of FIG. 6A to better show the relationship between the light projection engine 103 and how the pins extend from the light projection engine 103 through the frame 201. Although FIGS. 6A-6B shows four slotted holes 600A-600D, another embodiments may only two slotted holes 600A-600B that are used to align the light projection engine 103 with the optical waveguide assemblies 102.

Figure 7:
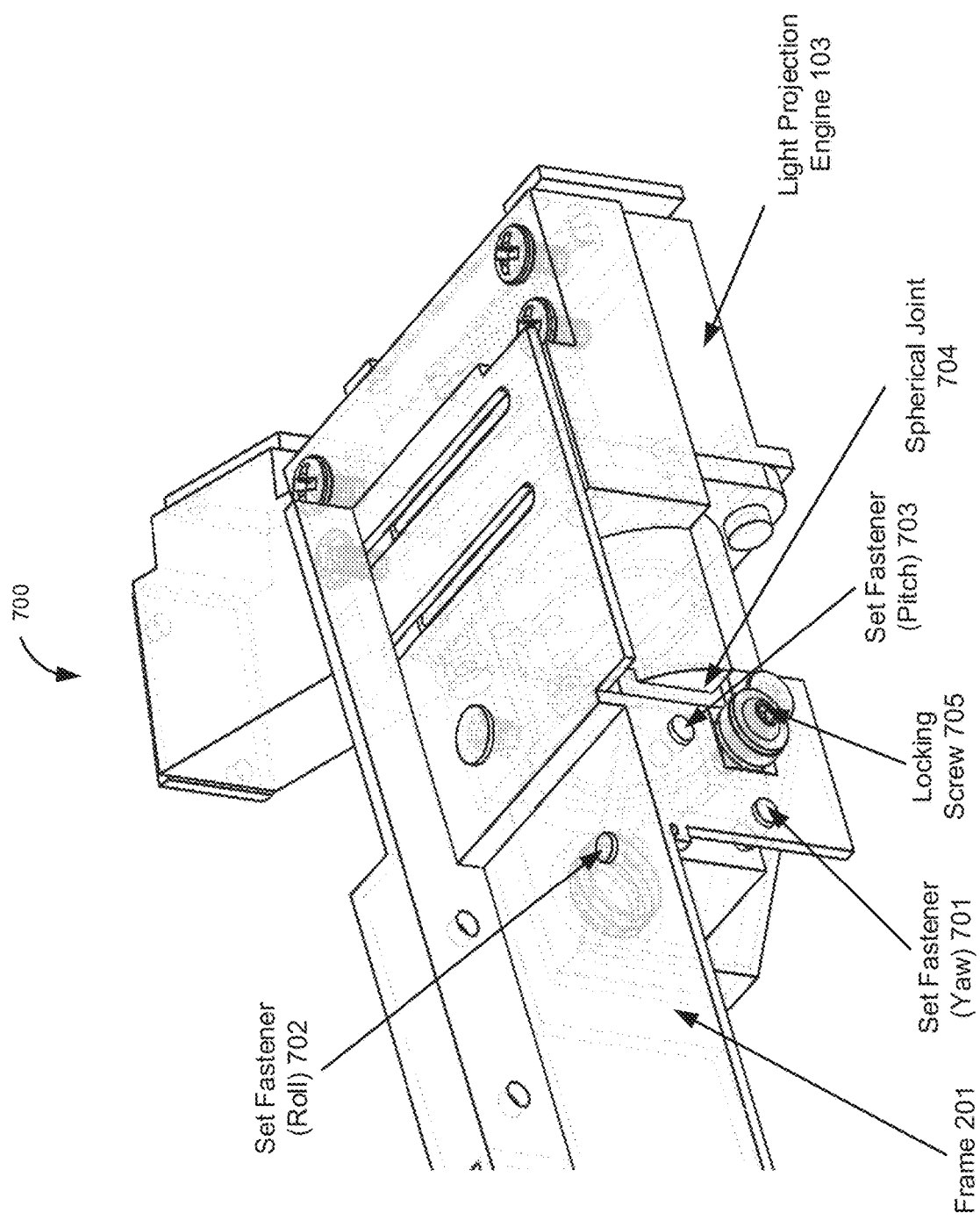
FIG. 7 is an angled view of an exemplary embodiment for aligning a light projection engine using three degrees (X, Y, and Z) of active alignment in accordance with embodiments of the present disclosure.

FIG. 7 is an angled view of an exemplary embodiment 700 for aligning a light projection engine 103 using three degrees (X, Y, and Z) of active alignment in accordance with embodiments of the present disclosure. To adjust the light projection engine 103 in all three degrees, is a spherical joint 704 is centered on an optical axis. To precisely control each of the degrees of rotation, a set fastener (e.g., screw or other type of fastener) 701(yaw), a set fastener (e.g., screw or other type of fastener) 702 (roll), and a set fastener (e.g., screw or other type of fastener) 703 (pitch) in conjuncture with springs precisely control pitch, roll and yaw. This approach has some similarities to a kinematic Tip/Tilt Mount and Spherical Joint. This approach allows each degree of rotation to be controlled by a single fastener. Once the alignment is been correctly adjusted, the locking fastener 705 is used to lock the alignment.

Figure 8:
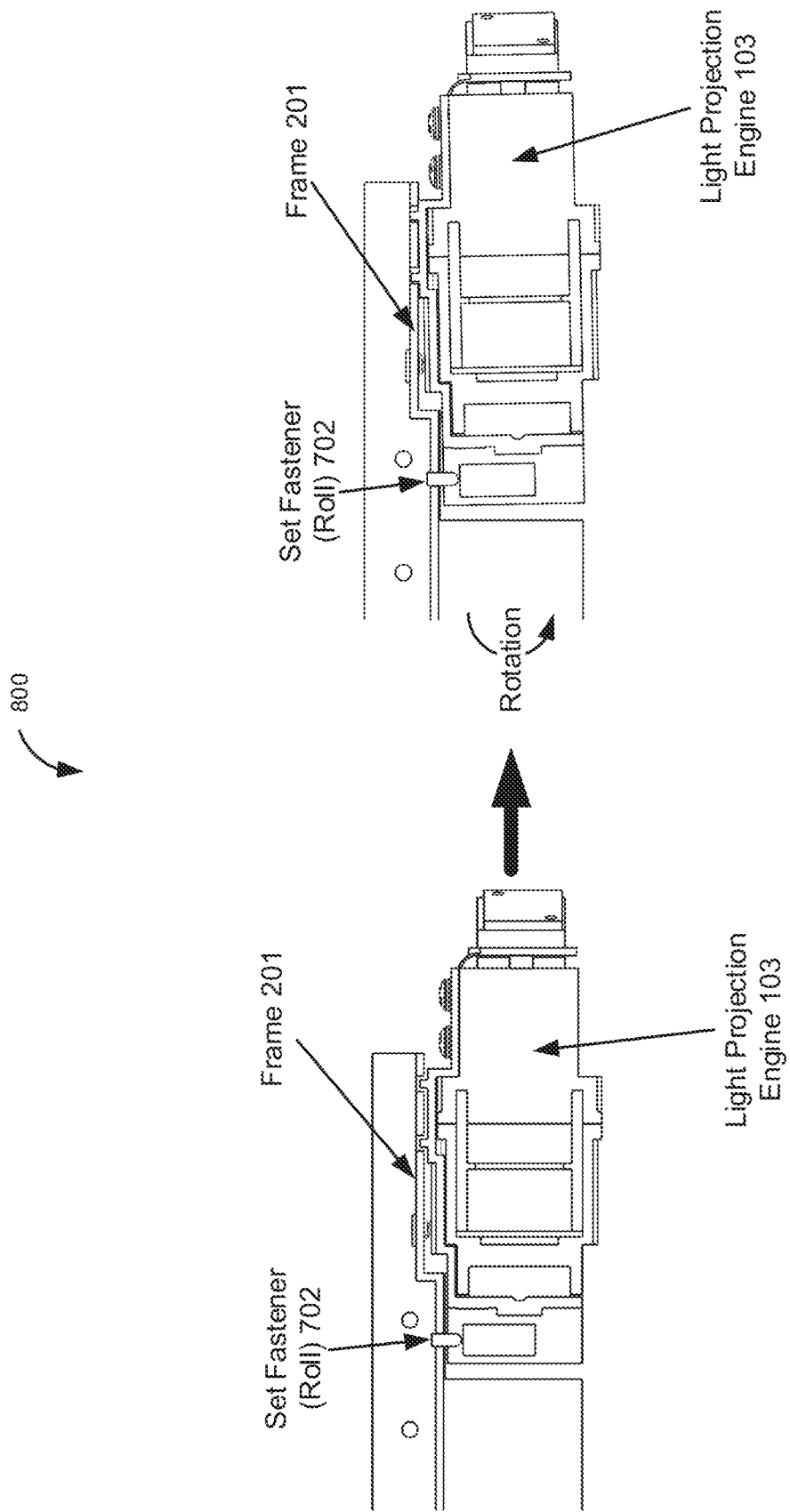
FIG. 8A is a cutout view of an exemplary embodiment for aligning a light projection engine using the Z axis (roll)
FIG. 8B is a cutout view of an exemplary embodiment for aligning a light projection engine that shows the rotation of the light projection engine on the Z axis (roll)

FIG. 8A is a cutout view of an exemplary embodiment for aligning a light projection engine 103 using the Z axis (roll). FIG. 8A is a cutout view of set fastener 702, which adjusts the roll or Z axis. FIG. 8A is a cutout view looking from the front of FIG. 7. The set fastener 702 (which screws into or otherwise connects with the frame 201), when screwed or moved inward, pushes on the light projection engine 103 to rotate on the Z axis (counter clock wise). If the set fastener 702 is unscrewed or otherwise unfastened, the rotation will be a clock wise rotation.

FIG. 8B is a cutout view of an exemplary embodiment for aligning a light projection engine 103 that shows the rotation of the light projection engine 103 on the Z axis (roll). FIG. 8B shows that the light projection engine 103 has rotated on the Z axis when the set fastener 702 is fastened into the frame 201.

Figure 9:
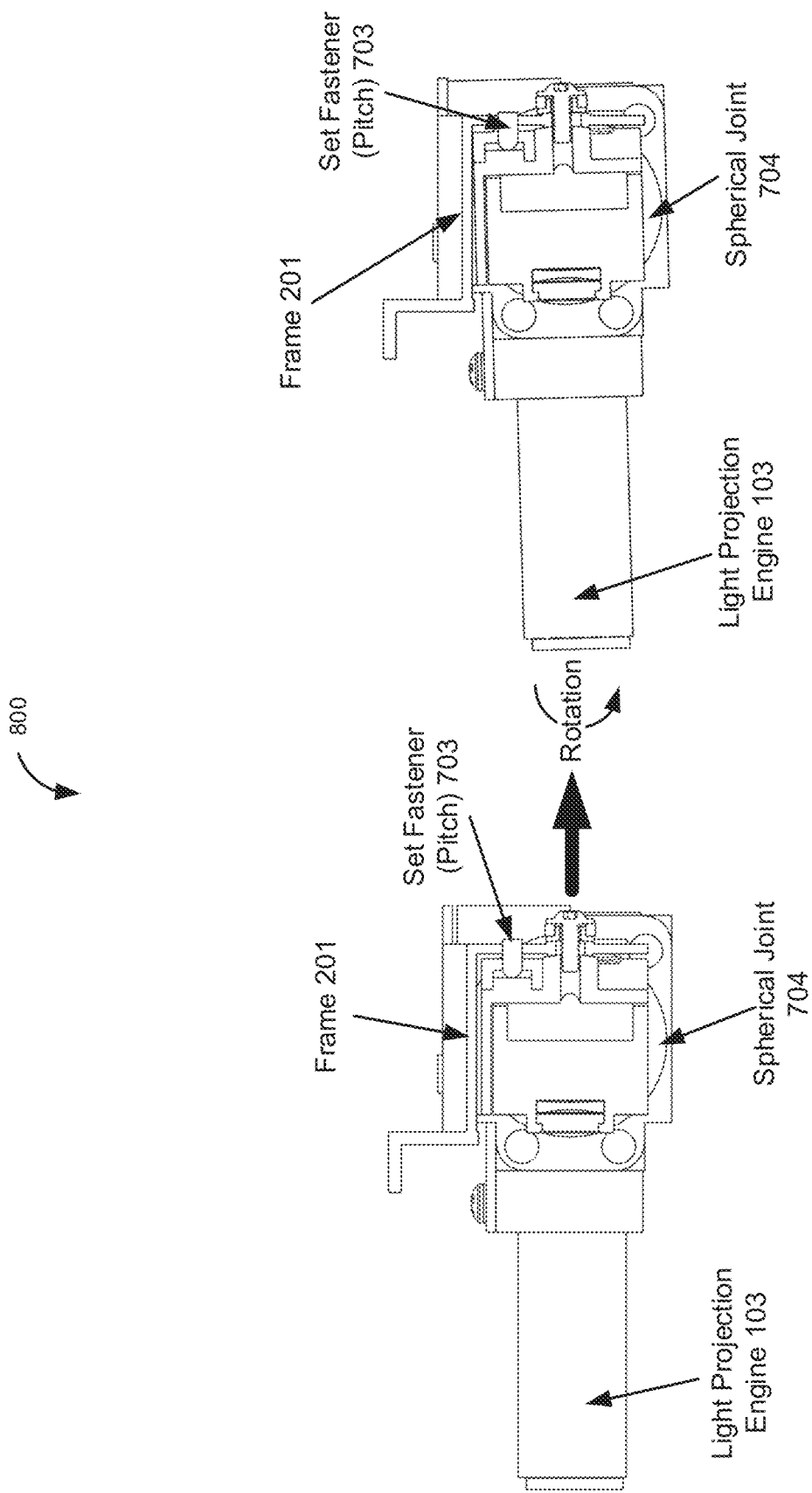
FIG. 9A is a cutout view of an exemplary embodiment for aligning a light projection engine using the X axis (pitch)
FIG. 9B is a cutout view of an exemplary embodiment for aligning a light projection engine that shows the rotation of the light projection engine on the X axis (pitch)

FIG. 9A is a cutout view of an exemplary embodiment for aligning a light projection engine 103 using the X axis (pitch). FIG. 9A is a side cutout view of set fastener 703, which adjusts the pitch or X axis. FIG. 9A is shown as a view from the left hand side of FIG. 7. The set fastener 703 (which fastens or screws into the frame 201), when screwed or moved inward, pushes on the light projection engine 103 to rotate on the x axis (counter clock wise). If the set fastener 702 is unscrewed or unfastened, the rotation will be a clock wise rotation.

FIG. 9B is a cutout view of an exemplary embodiment for aligning a light projection engine 103 that shows the rotation of the light projection engine 103 on the X axis (pitch). FIG. 9B shows that the light projection engine 103 has rotated on the X axis when the set fastener 703 is screwed or fastened into the frame 201.

Figure 10:
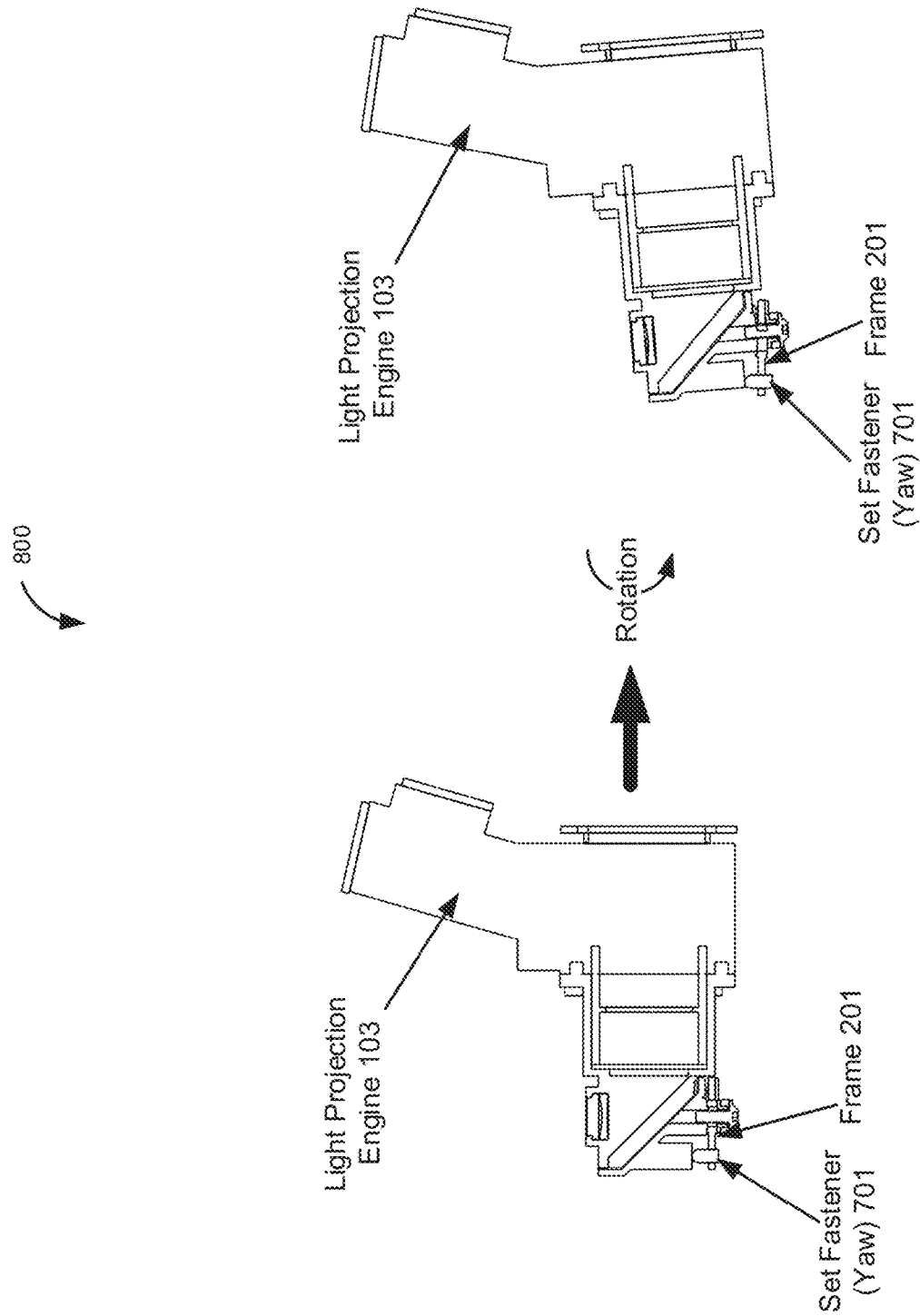
FIG. 10A is a cutout view of an exemplary embodiment for aligning a light projection engine using the Y axis (yaw)
FIG. 10B is a cutout view of an exemplary embodiment for aligning a light projection engine that shows the rotation of the light projection engine on the Y axis (yaw)

FIG. 10A is a cutout view of an exemplary embodiment for aligning a light projection engine 103 using the Y axis (yaw). FIG. 10A is a side cutout view of set fastener 701, which adjusts the Yaw or Y axis. FIG. 10A is a cutout view shown from the bottom of FIG. 7. The set fastener 701 (which screws or fastens into the frame 201), when screwed or moved inward, pushes on the light projection engine 103 to rotate on the X axis (clock wise). If the set fastener 702 is unscrewed or unfastened (as shown in FIG. 10A), the rotation is a clock wise rotation.

FIG. 10B is a cutout view of an exemplary embodiment for aligning a light projection engine 103 that shows the rotation of the light projection engine 103 on the Y axis (yaw). FIG. 10B shows that the light projection engine 103 has rotated on the Y axis when the set fastener 703 is unscrewed or unfastened from the frame 201.

Figure 11:
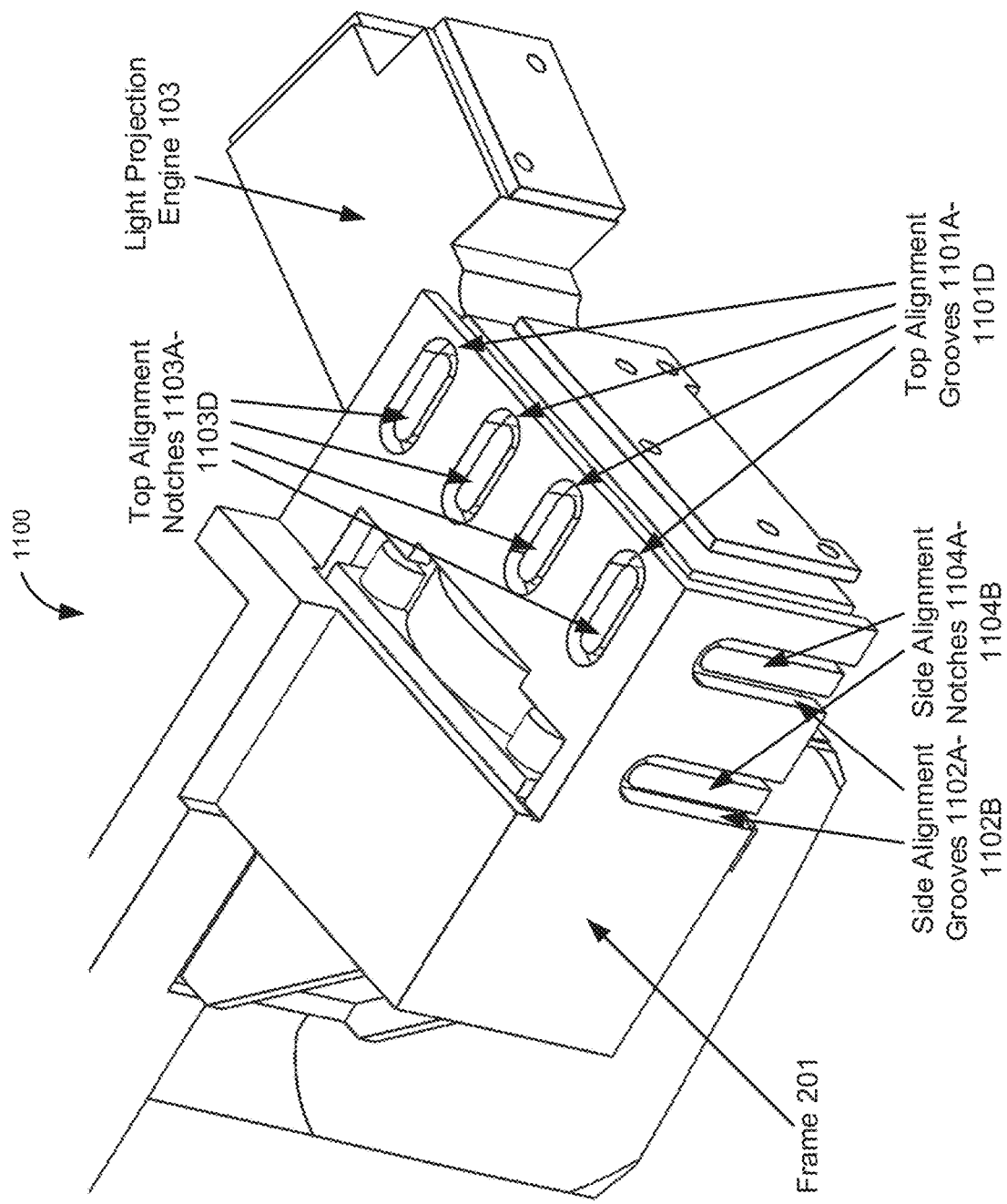
FIG. 11 is an angled view of an exemplary embodiment for aligning a light projection engine 103 using six degrees of freedom in accordance with embodiments of the present disclosure.

FIG. 11 is an angled view of an exemplary embodiment 1100 for aligning a light projection engine 103 using six degrees of freedom in accordance with embodiments of the present disclosure. To allow for six degrees of freedom, the light projection engine 103 is inserted into the frame 201 in which there is a gap surrounding the light projection engine 103. In FIG. 11, the frame 201 comprises top alignment grooves 1101A-1101D. The light projection engine 103 comprises corresponding top alignment notches 1103A-1103D. The frame 201 also comprises side alignment grooves 1102A-1102B. The light projection engine 103 also comprises corresponding side alignment notches 1104A-1104B. A fixture or jig can be used to actively align the light projection engine 103 in all six degrees of freedom. Once the light projection engine 103 is precisely aligned, liquid adhesive is used to adhere the light projection engine 103 to the frame 201. The liquid adhesive bridges between the light projection engine 103 and the frame 201 via the top alignment groves 1101A-1101D/side alignment groves 1102A-1102B.

For example, in a manufacturing environment where the frame 201 that is held in place by a fixture, the light projection engine 103 is aimed at a target. A person or machine then adjusts the light projection engine 103 until there is proper alignment of the light projection engine 103. When there is proper alignment of the light projection engine 103, liquid adhesive is applied/injected to each of the top alignment grooves 1101A-1101D/top alignment notches 1103A-1103D and the side alignment grooves 1102A-1102B/side alignment notches 1104A-1104B. When the liquid adhesive dries, the light projection engine 103 is properly aligned.

In one embodiment, to reduce the gap that the adhesive must fill, mechanical inserts (not shown) may be placed into between the frame 201 and the light projection engine 103. These inserts reduce the air gap that must be filled with adhesive as they are inserted when the light projection engine 103 is aligned.

In FIG. 11, there are four top alignment grooves 1101A-1101D and four corresponding top alignment notches 1103A-1103D. However, in other embodiments, there may be more or less top alignment grooves 1101/top alignment notches 1103. Instead of notches/grooves, other types of alignment elements may be envisioned, such as holes, squares, ovals, and/or the like with corresponding notch elements. Likewise, for the side alignment grooves 1102A-1102B/side alignment notches 1104A-1104B there may be more or less side alignment grooves 1102/side alignment notches 1104. Likewise, instead of side alignment grooves 1102A-1102B, other types of elements may be envisioned, such as such as holes, squares, ovals, and/or the like with corresponding side notch elements.

In another embodiment, the notches 1103/1104/grooves 1101/1102 may be reversed. For example, the notches 1103/1104 are in the frame 201 and the grooves 1101/1102 are in the light projection engine 103. These may be referred herein as corresponding grove/notch features.

Figure 12:
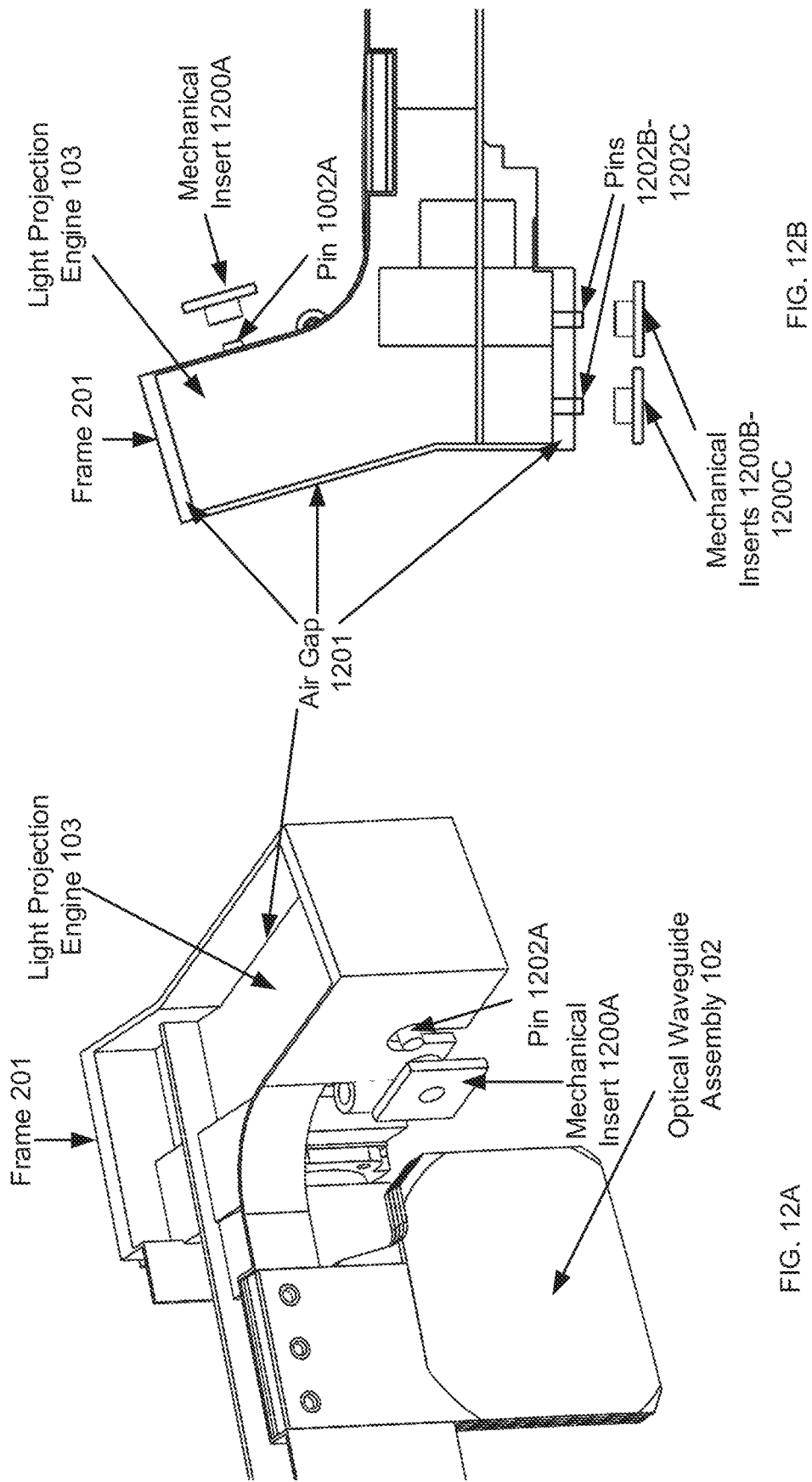
FIG. 12A is an angled view of an exemplary embodiment for aligning a light projection engine 103 that uses mechanical inserts 1000 and adhesive in accordance with embodiments of the present disclosure.
FIG. 12B is a side view of an exemplary embodiment for aligning a light projection engine that uses mechanical inserts and adhesive in accordance with embodiments of the present disclosure.

FIG. 12A is an angled view of an exemplary embodiment for aligning a light projection engine 103 that uses mechanical inserts 1200A-1200C and adhesive in accordance with embodiments of the present disclosure. In FIG. 12A there is an air gap 1201 that is between the light projection engine 103 and the frame 201. The mechanical insert 1200A connects to a pin 1202A that is part of (e.g., molded into) the light projection engine 103. In FIG. 12A the mechanical insert 1200A has a hole that can be filled with liquid adhesive to adhere the light projection engine 103 to the frame 201.

FIG. 12B is a side view of an exemplary embodiment for aligning a light projection engine 103 that uses mechanical inserts 1200A-1200C and liquid adhesive in accordance with embodiments of the present disclosure. FIG. 12B shows the mechanical inserts 1200A-1200C. The mechanical inserts 1200B-1200C also have holes like shown for the mechanical insert 1200A. The light projection engine 103 also has corresponding pins 1202B-1202C.

A fixture can be used to actively align the light projection engine 103. Once the light projection engine 103 is precisely aligned, liquid adhesive is placed on the mechanical inserts 1200A-1200C (i.e. on the surface and inside the mechanical inserts 1200A-1200C). The mechanical inserts 1200A-1200C are then inserted into the frame 201 to glue the frame 201 to the light projection engine 103. Although not shown, there may be more or less than three mechanical inserts 1200.

Figure 13:
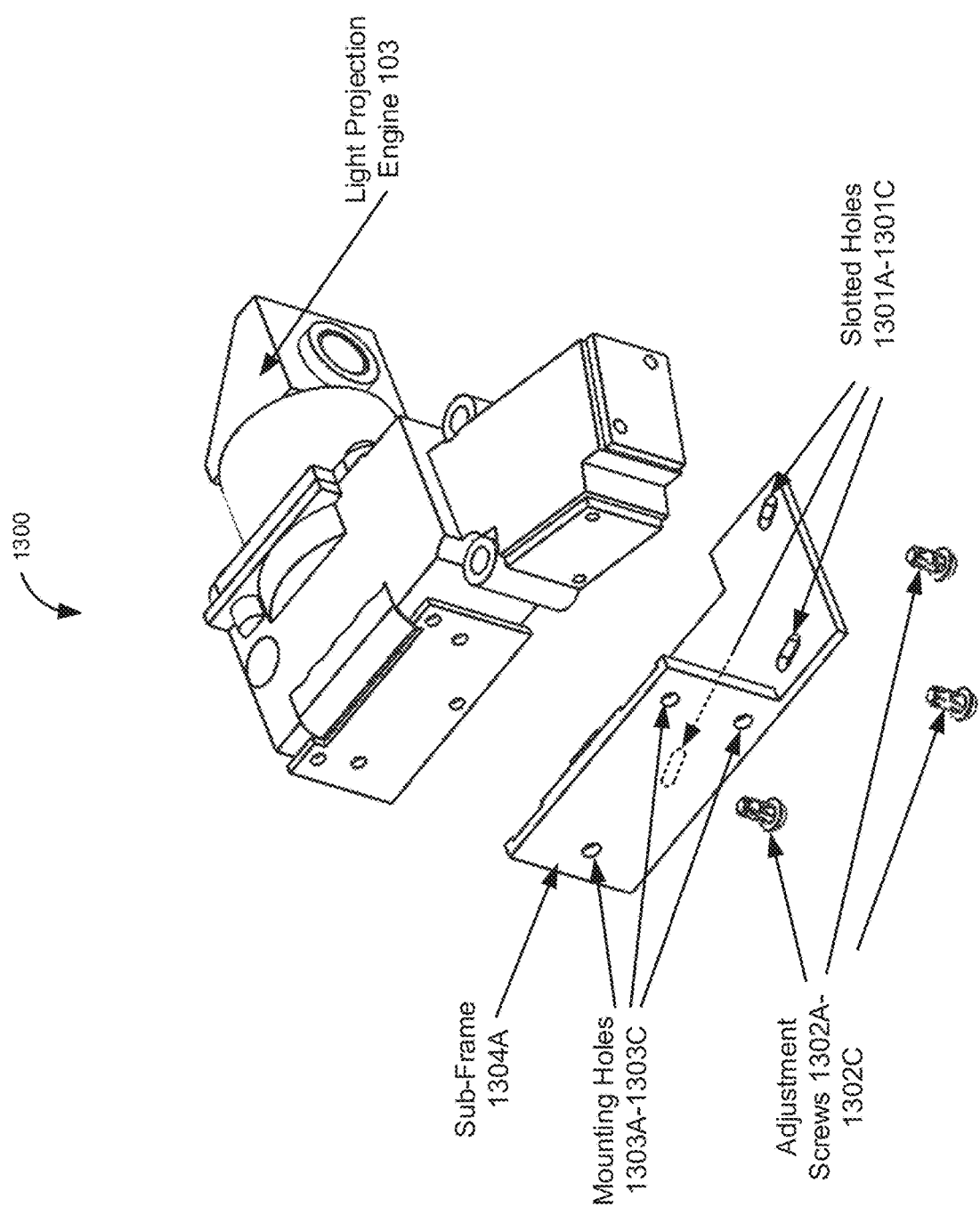
FIG. 13 is an angled view of an exemplary embodiment for aligning a light projection engine using a first planar joint in accordance with embodiments of the present disclosure.
Figure 14:
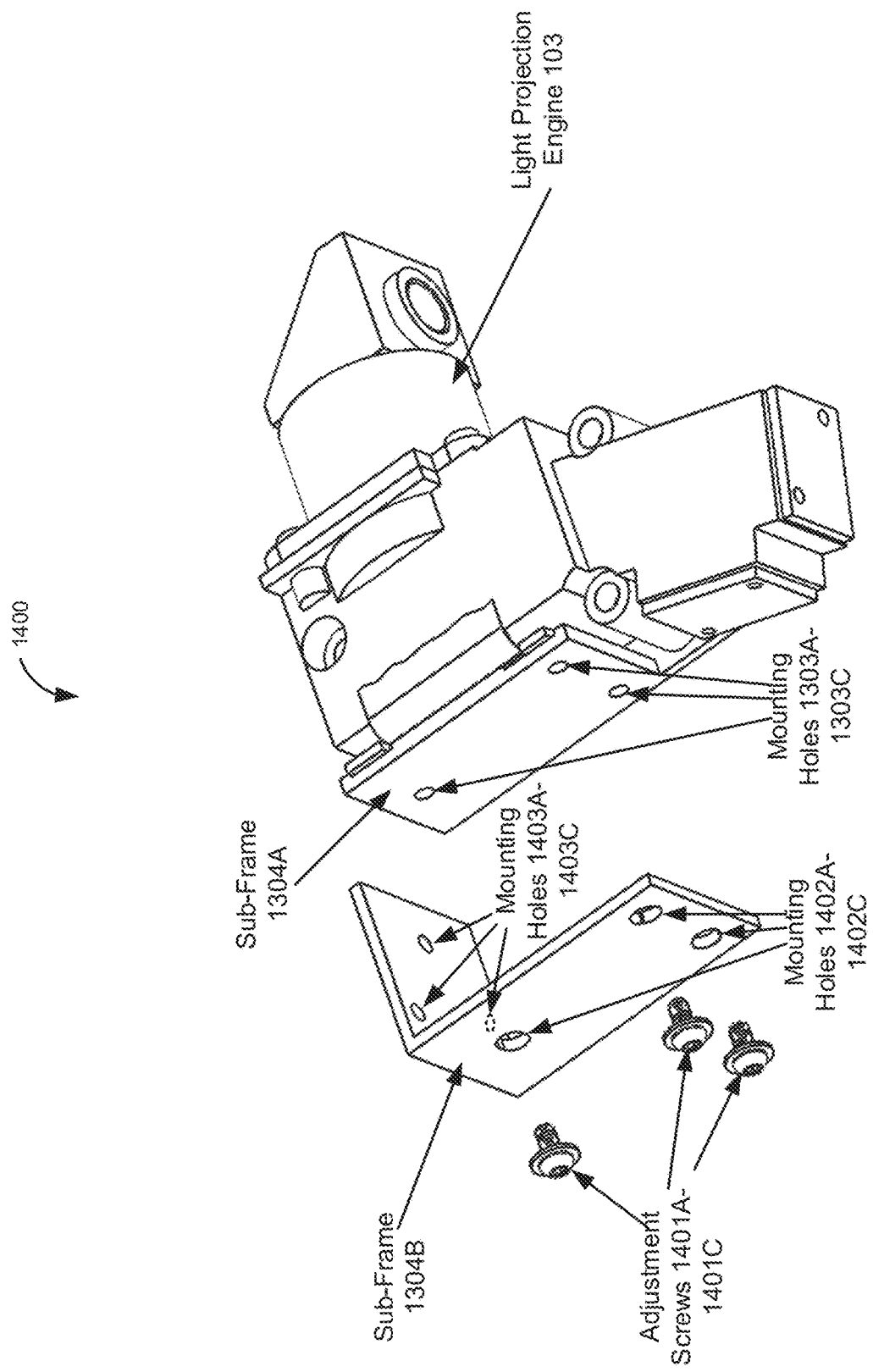
FIG. 14 is an angled view of an exemplary embodiment for aligning a light projection engine using a second planar joint in accordance with embodiments of the present disclosure.
Figure 15:
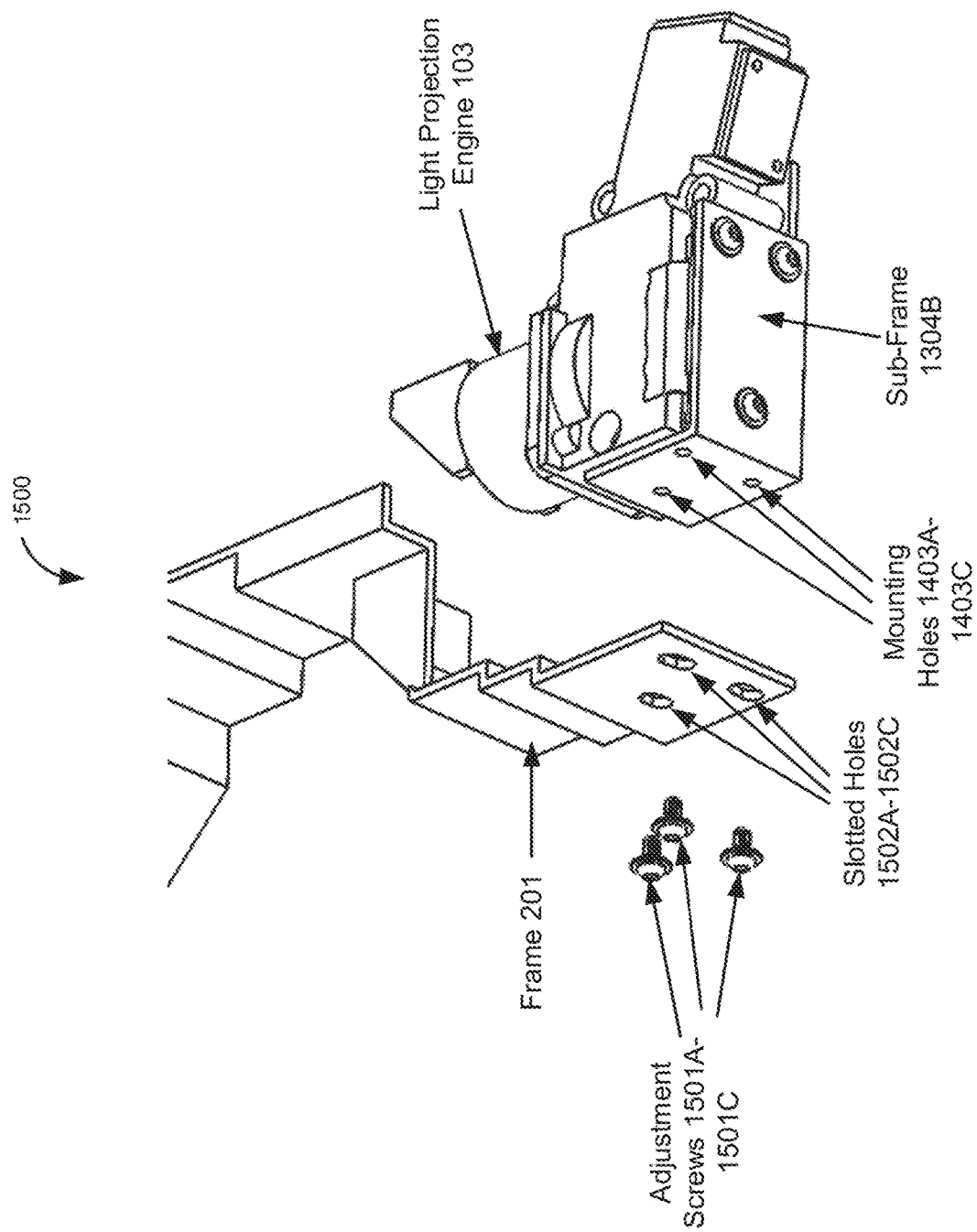
FIG. 15 is an angled view of an exemplary embodiment for aligning a light projection engine using a third planar joint in accordance with embodiments of the present disclosure.

FIGS. 13-15 describe an alignment process that provides six degree alignment. In order to simplify the six degree of freedom alignment, the alignment process is broken down into three steps that utilizes three separate planar joints. Each planar joint has three degrees of freedom one degree of freedom in rotation and two degrees of freedom in translations. To eliminate adjusting the same translation degree of freedom on two different steps, slotted holes/oversized holes are used in conjunction with pins and/or screws.

FIG. 13 is an angled view of an exemplary embodiment 1300 for aligning a light projection engine 103 using a first planar joint in accordance with embodiments of the present disclosure. FIG. 13 comprises the light projection engine 103, a sub-frame 1304A, and adjustment screws 1302A-1302C (or any fastener). The sub-frame 1304A comprises slotted holes 1301A-1301C and mounting holes 1303A-1303C. The slotted holes 1301A-1301C allow for the yaw (the Y axis) of the light projection engine 103 to be adjusted to proper alignment. In one embodiment, the slotted holes 1301A-1301C may be slightly curved. Once the yaw of the light projection engine 103 has been properly adjusted, the adjustment screws 1302A-1302C are tightened into place.

For example, the sub-frame 1304A may be placed into a fixture. The light projection engine 103 is then attached to the sub-frame 1304A where the adjustment screws 1302A-1302C are lightly tightened. For example, to where the light projection engine 103 can still be moved according to the size of the slotted holes 1301A-1301C. Once the yaw of the light projection engine 103 has been properly aligned, the adjustment screws 1302A-1302C are then firmly tightened (and possibly glued).

FIG. 14 is an angled view of an exemplary embodiment 1400 for aligning a light projection engine 103 using a second planar joint in accordance with embodiments of the present disclosure. FIG. 14 comprises the light projection engine 103 with the attached sub-frame 1304A (described in FIG. 13). The sub-frame 1304A comprises mounting holes 1303A-1303C as shown in FIG. 13.

FIG. 14 further comprises sub-frame 1304B and adjustment screws 1401A-1401C (or fasteners). The sub-frame 1304B comprises mounting holes 1402A-1402C and mounting holes 1403A-1403C. The mounting holes 1402A-1402C are larger than the mounting holes 1303A-1303C. This allows for adjustment of the pitch (X axis) translation in Y and translation in Z of the light projection engine 103. Once the pitch and roll and translation in Y and Z of the light projection engine 103 have been adjusted, the adjustment screws 1401A-1401C are tightened into place in the mounting holes 1303A-1303C. Translation in Y adjustments is not as critical in this step as this translation can also be adjusted in the next step.

For example, the sub-frame 1304B may be placed into a fixture. The light projection engine 103 (with sub-frame 1304A) is then attached to the sub-frame 1304B where the screws are lightly tightened. For example, to where the light projection engine 103 can still be moved according to the larger size of the mounting holes 1402A-1402C. Once the pitch, Y translation and Z translation of the light projection engine 103 has been properly aligned, the adjustment screws 1401A-1401C are then firmly tightened (and possibly glued).

FIG. 15 is an angled view of an exemplary embodiment 1500 for aligning a light projection engine 103 using a third planar joint in accordance with embodiments of the present disclosure. FIG. 15 comprises the light projection engine 103 (with the sub-frames 1304A-1304B), the frame 201, and adjustment screws 1501A-1501C (or fasteners). The sub-frame 1304B comprises mounting holes 1403A-1403C (shown in FIG. 14).

The frame 201 comprises slotted holes 1502A-1502C. The slotted holes 1502A-1502C are also larger than the size of the adjustment screws 1501A-1501C. The slotted holes 1502A-1502C allow for adjustment of roll (Z axis), X translation and Y translation of the light projection engine 103. Once the roll, X translation and Y translation of the light projection engine 103 have been adjusted, the adjustment screws 1501A-1501C are tightened into place into the mounting holes 1403A-1403C.

For example, the frame 201 may be placed into a fixture. The light projection engine 103 (with sub-frames 1304A-1304B) is then attached to the frame 201 where the adjustment screws 1501A-1501C are lightly tightened (e.g., to where the light projection engine 103 can still be moved according to the size of the slotted holes 1502A-1502C. Once the roll, X translation and Y translation of the light projection engine 103 has been properly aligned, the adjustment screws 1502A-1502C are then firmly tightened (and possibly glued).

Figure 16:
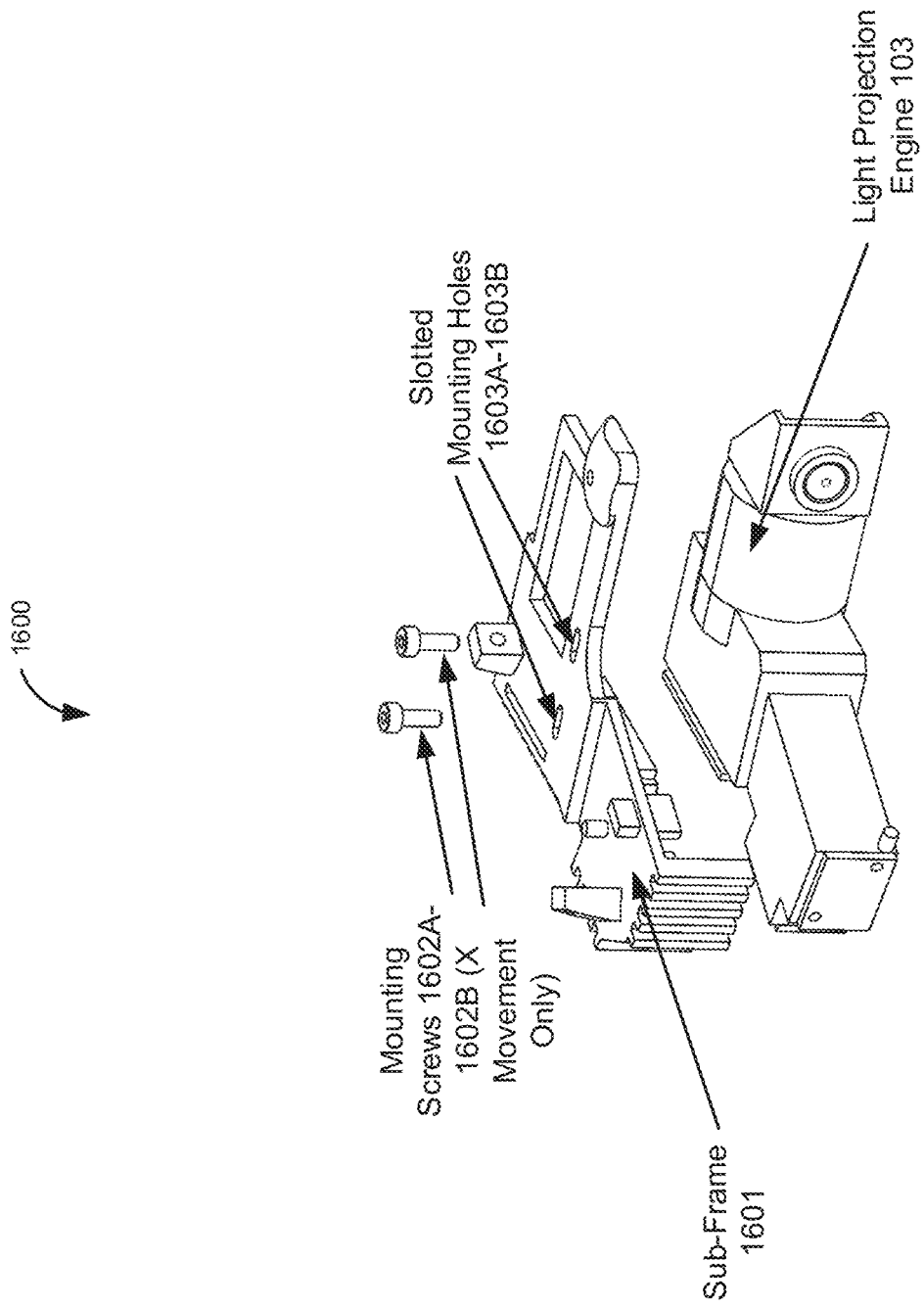
FIG. 16 is a view of a first assembly of an exemplary embodiment that provides six degrees of freedom.
Figure 17:
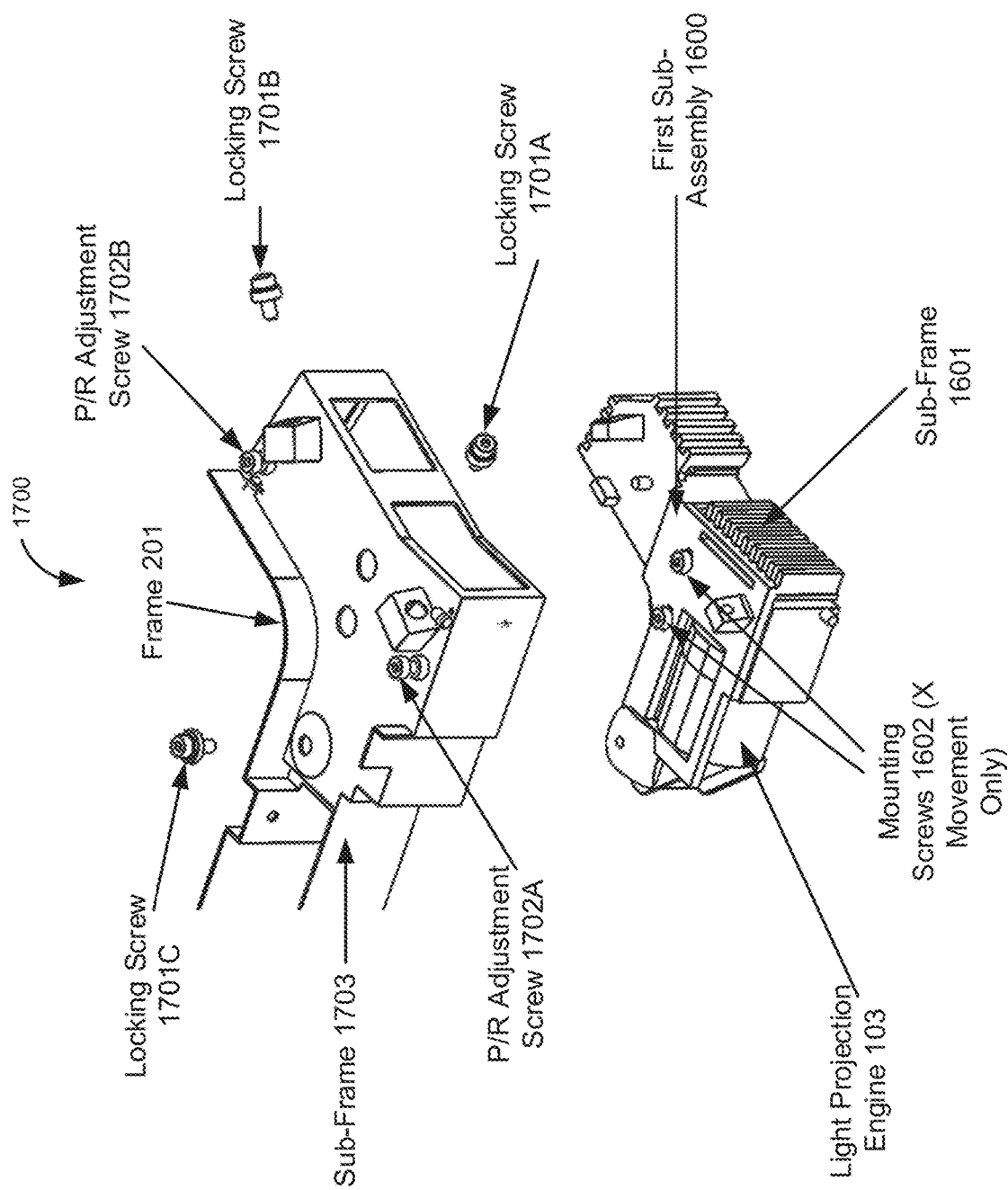
FIG. 17 is a view of a second assembly of an exemplary embodiment that provides six degrees of freedom.
Figure 18:
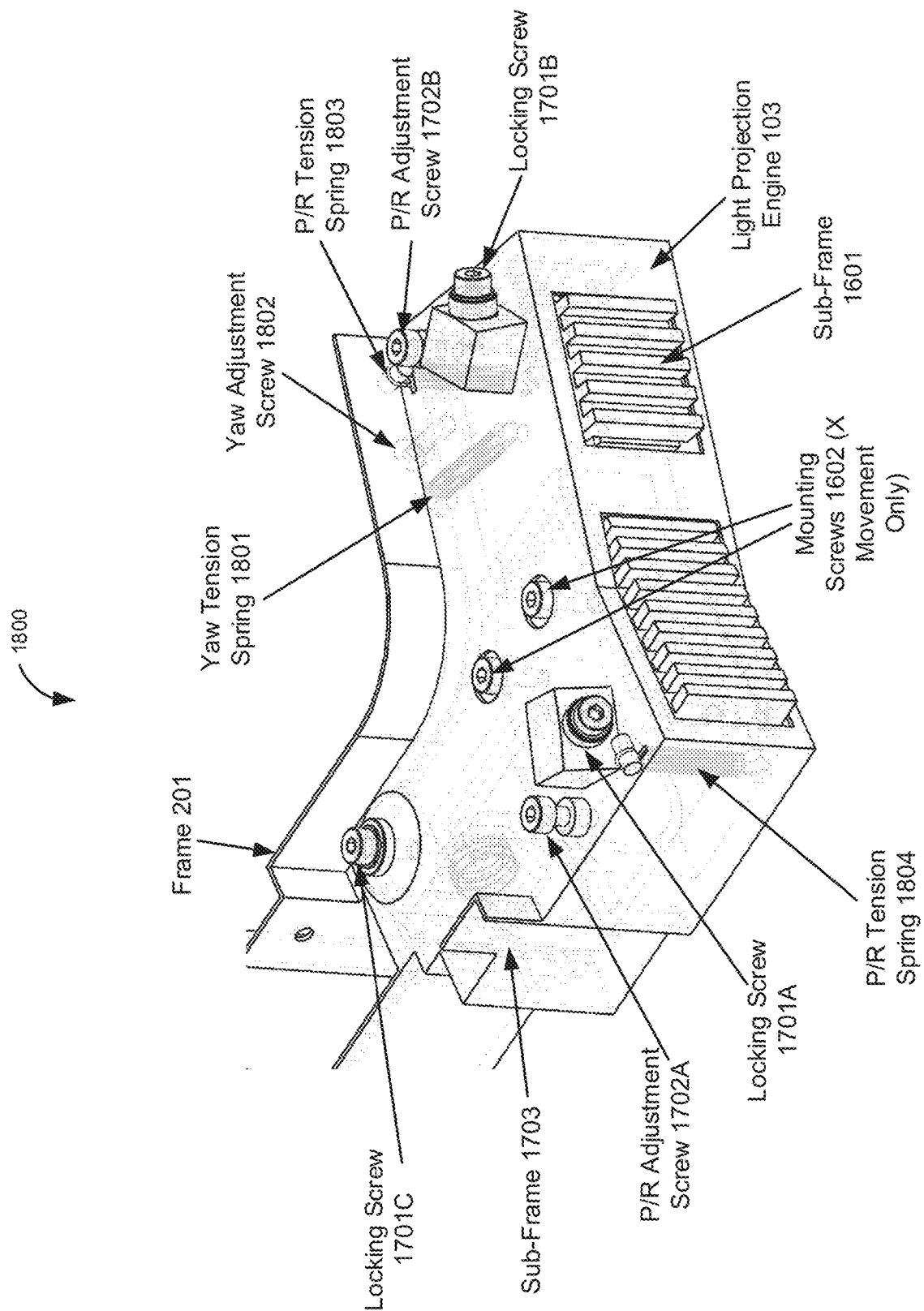
FIG. 18 is view of a completed assembly of an exemplary embodiment that provides six degrees of freedom.

FIGS. 16-18 discusses using screws. However, on other embodiments, fasteners may be used in place of screws.

FIG. 16 is a view of a first assembly 1600 of an exemplary embodiment that provides six degrees of freedom. The first assembly 1600 comprises the light projection engine 103, a sub-frame 1601, and mounting screws 1602A-1602B. In this exemplary embodiment, the sub-frame 1601 also includes a heatsink. The mounting screws 1602A-1602B attach the light projection engine 103 via the slotted mounting holes 1603A-1603B in the sub-frame 1601. The slotted mounting holes 1603A-1603B allow adjustment of the light projection engine 103 on the X axis (pitch). The mounting screws 1602 are lightly tightened and the pitch of the light projection engine 103 is adjusted until it is aligned. Once aligned, the mounting screws may be glued with liquid adhesive.

FIG. 17 is a view of a second assembly 1700 of an exemplary embodiment that provides six degrees of freedom. The second assembly 1700 comprises the first assembly 1600, locking screws 1701A-1701C, pitch/roll adjustment screws 1702A-1702B, and sub-frame 1703. The sub-frame 1703 is attached to the frame 201. The sub-frame 1703 attaches to the first sub-assembly 1600 via the pitch/roll adjustment screws 1702A-1702B. The pitch/roll adjustment screws 1702A-1702B are adjusted until the pitch/roll of the light projection engine 103 is aligned.

FIG. 18 is view of a completed assembly 1800 of an exemplary embodiment that provides six degrees of freedom. FIG. 18 is the completed assembly of FIG. 17. In addition FIG. 18 comprises yaw tension spring 1801, yaw adjustment screw 1802, pitch/roll tension spring 1803, and pitch/roll tension spring 1804. The tension springs 1801, 1803, and 1804 are used to hold the position of the completed assembly 1800 when adjusted. After making the adjustments using the pitch/roll adjustment screws 1702A-1702B, the yaw adjustment screw is adjusted to further align the light projection engine 103 on the Y axis. Once adjusted, the locking screws 1701A-1701C are tightened to lock the X, Y, and Z adjustments for the light projection engine 103.

Figure 19:
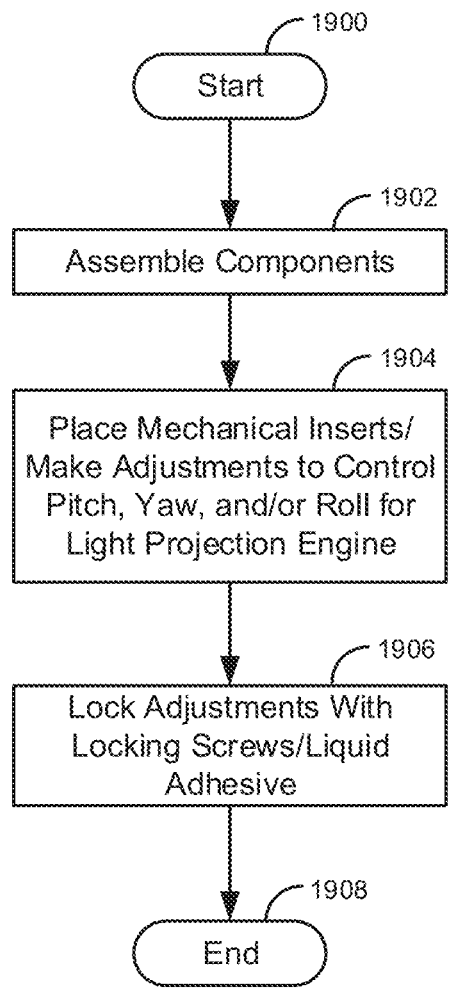
FIG. 19 is a flow diagram of a process for adjusting a light projection engine with a waveguide assembly.

FIG. 19 is a flow diagram of a process for adjusting a light projection engine 103 with a waveguide assembly. FIG. 19 is a flow diagram for the assemblies described in FIGS. 3-12. The process starts in step 1900. The components (e.g., the light projection engine 103, the optical waveguide assembly 102, the frame 201, the pins 202, the screws 203A-203D, etc.) are assembled in step 1902. The mechanical inserts are 1200 placed or adjustments are made (e.g., using screws 302A-302B) in the manner described in FIGS. 3-12 in step 1904. The adjustments are locked in step 1906. For example, the adjustments are locked by tightening screws and/or applying liquid adhesive. The process then ends in step 1908.

Figure 20:
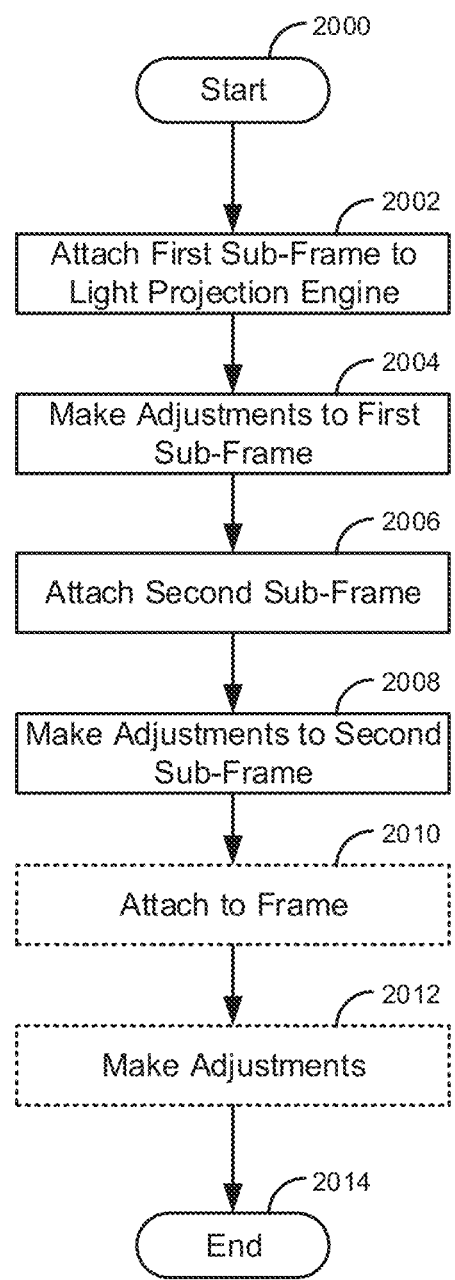
FIG. 20 is a flow diagram of a process for adjusting a light projection engine using multiple sub-frames.

FIG. 20 is a flow diagram of a process for adjusting a light projection engine 103 using multiple sub-frames. FIG. 20 is a flow diagram for the assemblies described in FIGS. 13-18. The process starts in step 2000. The first sub-frame (e.g., 1304A or 1601) is attached to the light projection engine 103 (e.g., as described in FIGS. 13 and 16) in step 2002. Adjustments are then made to adjust the first sub-frame (1304A or 1601) in step 2004. The second sub-frame (e.g., 1304B or 1703) is attached to the first sub-frame (1304A or 1601) in step 2006 (e.g., as described in FIGS. 14 and 17). Adjustments are then made to the second sub-frame in step 2008 (e.g., as described in FIGS. 14 and 17). The second sub-frame is attached to the frame 201 (e.g., as described in FIG. 15). Adjustments are then made to further adjust the light projection engine 103 in step 1012. The process then ends in step 2014.

As described herein an in the claims, a screw may be a threaded element or a non-thread element that secures two different elements, such as rivet, and/or the like.

Any of the steps, functions, and operations discussed herein can be performed continuously and automatically.

The exemplary systems and methods of this disclosure have been described in relation to different kinds of virtual reality headsets 101. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an assembly comprising: a frame; an optical waveguide assembly; a light projection engine; a pin, wherein the pin allows the light projection engine to rotate on a pivot point in relation to the optical waveguide assembly; and one or more screws, wherein the frame has a freedom of movement in relation to the one or more screws to allow for adjustment of the projection engine on the pivot point in relation to the optical waveguide assembly.

Aspects of the above include the assembly, wherein the pivot point allows for adjustment of the light projection engine on a Z axis.

Embodiments include an assembly comprising: a frame; an optical waveguide assembly; a light projection engine; a pin, wherein the ping allows the light projection engine to rotate on a pivot point in relation to the frame and the optical waveguide assembly, a cam; and a spring, wherein the cam is used to rotate the light projection engine on the pivot point and wherein the spring holds the light projection engine in alignment once adjusted.

Embodiments include an assembly comprising: a frame; an optical waveguide assembly; a light projection engine; and one or more screws, wherein the frame has a freedom of movement in relation to the one or more screws to allow for adjustment of the projection engine on an optical axis in relation to the optical waveguide assembly.

Aspects of the above include an assembly, wherein the one or more screws comprises a plurality of screws.

Embodiments include an assembly comprising: a frame; an optical waveguide assembly; a light projection engine, wherein the light projection engine and/or the frame has a plurality of slotted holes that align with a corresponding pin in the light projection engine or frame and wherein the plurality of slotted holes align with an optical axis of the waveguide assembly.

Aspects of the above include an assembly wherein the plurality of slotted holes are in the frame and the plurality of pins are in the light projection engine.

Aspects of the above include an assembly wherein the plurality of slotted holes are in the light projection engine and the plurality of pins are in the frame.

Aspects of the above include an assembly wherein the plurality of slotted holes are curved in relation to the optical axis.

Aspects of the above include an assembly further comprising a liquid adhesive that attaches the frame to the light projection engine to align the light projection engine to the optical waveguide assembly.

Embodiments include an assembly comprising: a frame; an optical waveguide assembly; a light projection engine; a spherical joint; and three set screws, wherein the three set screws allow adjustment using the spherical joint on an X axis, a Y axis and a Z axis.

Aspects of the above include an assembly further comprising one or more locking screws, wherein the one or more locking screws are used to lock the adjustment using the spherical joint on the X axis, the Y axis and the Z axis.

Embodiments include an assembly comprising: a frame; an optical waveguide assembly; and a light projection engine, wherein the light projection engine and/or the frame has a plurality of alignment notches that align with plurality of corresponding grooves in the light projection engine or frame and wherein the plurality of alignment notches and corresponding grooves are on multiple sides of the light projection engine and the frame.

Aspects of the above include an assembly wherein the plurality of alignment notches are in the light projection engine and the plurality of corresponding grooves are in the frame.

Aspects of the above include an assembly wherein the plurality of alignment notches are in the frame and the plurality of corresponding grooves are in the light projection engine.

Aspects of the above include an assembly further comprising a liquid adhesive that is applied to the plurality of alignment notches and the plurality of corresponding grooves when the light projection engine is properly aligned with the optical waveguide assembly.

Aspects of the above include an assembly further comprising one or more mechanical inserts, wherein the one or more mechanical inserts are inserted in an air gap between the frame and the light projection engine to properly align the light projection engine with the optical waveguide assembly.

Embodiments include an assembly comprising: a frame; an optical waveguide assembly; a light projection engine, wherein the frame encompasses at least a portion of the light projection engine and wherein there is an air gap between the frame and the encompassed portion of the light projection engine; and a plurality of mechanical inserts, wherein the plurality of mechanical inserts attach to the frame and the light projection engine to align the light projection engine to the optical waveguide assembly.

Aspects of the above include an assembly further comprising liquid adhesive that is applied to the mechanical inserts that locks alignment of the light projection engine to the optical waveguide assembly.

Embodiments include an assembly comprising: a light projection engine, a first sub-frame that is connected to the light projection engine; a second sub-frame that is connected to the first sub-frame; a frame that is connected to the second sub-frame; and an optical waveguide assembly, wherein connecting the first sub-frame to the light projection engine is used to align the light projection engine to the optical waveguide assembly, wherein connecting the second sub-frame to the first sub-frame is used to align the light projection engine to the optical waveguide assembly, and wherein connecting the frame to the second sub-frame is used to align the light projection engine to the optical waveguide assembly.

Aspects of the above include an assembly wherein the first sub-frame comprises a plurality slotted holes and wherein the plurality of slotted holes are used to align the light projection engine to the optical waveguide assembly on a Y axis.

Aspects of the above include an assembly wherein the second sub-frame comprises a plurality of holes that are larger than inserted screws, wherein the plurality of holes that are larger than the inserted screws are used to align the light projection engine to the optical waveguide assembly on a Z axis.

Aspects of the above include an assembly wherein the frame comprises a plurality of slotted holes and wherein the plurality of slotted holes are used to align the light projection engine to the optical waveguide assembly on a X axis.

Embodiments include an assembly comprising: a light projection engine; a first sub-frame that is connected to the light projection engine; a second sub-frame that is connected to the first sub-frame; a frame that is connected to the second sub-frame; an optical waveguide assembly, wherein the connecting the first sub-frame to the light projection engine is used to align the light projection engine to the optical waveguide assembly and wherein the connecting the second sub-frame to the first sub-frame is used to align the light projection engine to the optical waveguide assembly.

Aspects of the above include an assembly wherein the first sub-frame has a plurality of slotted holes that are used to align the light projection engine to the optical waveguide assembly on an X axis.

Aspects of the above include an assembly further comprising two screws that are used to adjust an X axis and a Z axis of the light projection engine in relation to the optical waveguide assembly.

Aspects of the above include an assembly further comprising a screw that attaches through the frame that is used to adjust the light projection engine in relation to the optical waveguide assembly on a Y axis.

Aspects of the above include an assembly further comprising one or more springs that are used to align the light projection engine to the optical waveguide assembly.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

What is claimed is:

1. An image generating headset assembly comprising:
a frame;
an optical waveguide assembly, wherein the optical waveguide assembly connects to the frame;
a light projection engine, wherein the light projection engine or the frame has a plurality of slotted holes that align with a corresponding pin of a plurality of pins in the other of the light projection engine or the frame to connect the light projection engine to the frame, wherein the plurality of slotted holes are curved in relation to an optical axis of the waveguide assembly, and wherein the plurality of slotted holes provide one or more pivot points to rotate the light projection engine respective to the optical waveguide assembly on at least one of an X axis, a Y axis, and a Z axis.

2. The image generating headset assembly of claim 1, wherein the plurality of slotted holes are in the frame and the plurality of pins are in the light projection engine.

3. The image generating headset assembly of claim 1, wherein the plurality of slotted holes are in the light projection engine and the plurality of pins are in the frame.

4. The image generating headset assembly of claim 1 further comprising a liquid adhesive that attaches the frame to the light projection engine once the light projection engine is aligned to the optical waveguide assembly.

5. A virtual reality headset assembly comprising:
a frame;
an optical waveguide assembly; and
a light projection engine, wherein the light projection engine or the frame has a plurality of alignment notches on multiple sides that align with a plurality of corresponding grooves in the other of the light projection engine or the frame, and wherein the plurality of alignment notches and the plurality of corresponding grooves allow the light projection engine to rotate respective to the optical waveguide assembly on at least one of an X axis, a Y axis, and a Z axis.

6. The virtual reality headset assembly of claim 5, wherein the plurality of alignment notches are in the light projection engine and the plurality of corresponding grooves are in the frame.

7. The virtual reality headset assembly of claim 5, wherein the plurality of alignment notches are in the frame and the plurality of corresponding grooves are in the light projection engine.

8. The virtual reality headset assembly of claim 5, further comprising a liquid adhesive that is applied to the plurality of alignment notches and the plurality of corresponding grooves when the light projection engine is properly aligned with the optical waveguide assembly.

9. The virtual reality headset assembly of claim 5, further comprising one or more mechanical inserts, wherein the one or more mechanical inserts are inserted in a gap between the frame and the light projection engine to reduce the gap to be filled with an adhesive.

10. The image generating headset assembly of claim 1 further comprising:
- a cam, wherein the cam can move inward or outward relative to the frame, and wherein the cam is used to stop rotation of the light projection engine; and
- a spring, wherein the spring provides tension to limit movement of the light projection engine.

* * * * *